(12) United States Patent
Vierra

(10) Patent No.: US 11,532,141 B1
(45) Date of Patent: Dec. 20, 2022

(54) AR/VR INTERFACE FOR CLIENT/CONTRACTOR COMMUNICATION PLATFORM

(71) Applicant: STRUKSHUR INC., Santa Rosa, CA (US)

(72) Inventor: Louis A Vierra, Sonoma, CA (US)

(73) Assignee: STRUKSHUR INC., Santa Rosa, CA (US)

( * ) Notice: Subject to any disclaimer, the term of this patent is extended or adjusted under 35 U.S.C. 154(b) by 0 days.

(21) Appl. No.: 17/446,643

(22) Filed: Sep. 1, 2021

Related U.S. Application Data

(63) Continuation of application No. 16/423,963, filed on May 28, 2019, now abandoned.

(60) Provisional application No. 62/676,622, filed on May 25, 2018.

(51) Int. Cl.
*G06T 19/00* (2011.01)
*G06T 17/00* (2006.01)
*G06F 3/04815* (2022.01)
*H04L 67/131* (2022.01)

(52) U.S. Cl.
CPC ........ *G06T 19/006* (2013.01); *G06F 3/04815* (2013.01); *G06T 17/00* (2013.01); *H04L 67/131* (2022.05)

(58) Field of Classification Search
None
See application file for complete search history.

(56) References Cited

U.S. PATENT DOCUMENTS

| 7,155,715 | B1 | 12/2006 | Cui et al. |
| 2005/0038636 | A1 | 2/2005 | Wakelam et al. |
| 2006/0044307 | A1 | 3/2006 | Song |
| 2007/0061774 | A1 | 3/2007 | Chan et al. |
| 2007/0150327 | A1 | 6/2007 | Dromgold |
| 2007/0245300 | A1* | 10/2007 | Chan ...................... G06Q 10/06 717/104 |

(Continued)

OTHER PUBLICATIONS

"U.S. Appl. No. 16/423,963, Final Office Action dated Mar. 1, 2021".

(Continued)

*Primary Examiner* — Yanna Wu
(74) *Attorney, Agent, or Firm* — Schwegman Lundberg & Woessner, P.A.

(57) ABSTRACT

User interfaces, systems, methods, devices, media, and instructions are described for a client/contractor management and communication system with augmented reality (AR) and/or virtual reality (VR) interface elements. In one embodiment, a device receives finish and inspiration information associated with a home improvement project from a client and structures this information into finish pin data with associated project context information and 3D model data. The device uses this information to automatically generate and update a project chart for the project, along with 3D models for various subproject positions within a project chart. This information is then presented to the client and associated contractors as part of a user interface for a client/contractor system. A project chart interface enables access to 3D models in an AR or VR interface to display models of the project and various project data associated with different positions in a project chart.

20 Claims, 24 Drawing Sheets

(56) References Cited

U.S. PATENT DOCUMENTS

| | | |
|---|---|---|
| 2009/0125352 A1 | 5/2009 | Miyake et al. |
| 2009/0138113 A1 | 5/2009 | Hoguet |
| 2009/0187384 A1 | 7/2009 | Nonaka et al. |
| 2010/0114635 A1 | 5/2010 | Watanabe et al. |
| 2010/0174656 A1 | 7/2010 | Nolan |
| 2010/0185547 A1 | 7/2010 | Scholar |
| 2010/0198652 A1 | 8/2010 | Spanton, Jr. et al. |
| 2010/0211421 A1 | 8/2010 | Sciammarella et al. |
| 2014/0032255 A1 | 1/2014 | Hegazi |
| 2014/0095122 A1 | 4/2014 | Appleman et al. |
| 2014/0207507 A1 | 7/2014 | Cirianni |
| 2014/0207512 A1* | 7/2014 | Khanzode ........ G06Q 10/06312 705/7.22 |
| 2014/0229212 A1 | 8/2014 | Macelheron et al. |
| 2015/0254597 A1 | 9/2015 | Jahagirdar |
| 2015/0269524 A1 | 9/2015 | Greene et al. |
| 2015/0324940 A1* | 11/2015 | Samson ........... G06Q 10/06313 705/7.23 |
| 2015/0371168 A1 | 12/2015 | Karabin |
| 2016/0189071 A1 | 6/2016 | Scholar |
| 2016/0335731 A1 | 11/2016 | Hall |
| 2016/0350700 A1 | 12/2016 | Leary et al. |
| 2017/0061360 A1 | 3/2017 | Rucker et al. |
| 2017/0091685 A1 | 3/2017 | Karabin |
| 2018/0332446 A1 | 11/2018 | Seidman |

OTHER PUBLICATIONS

"U.S. Appl. No. 16/423,963, Non Final Office Action dated Aug. 4, 2020", 26 pgs.

"U.S. Appl. No. 16/423,963, Response filed Feb. 2, 2021 to Non Final Office Action dated Aug. 4, 2020", 12 pgs.

* cited by examiner

BUILDING EXTERIOR 952

ROOF 954A

SIDING AND TRIM 954B

WINDOWS 954D

LIGHTING 954C

OTHER 954E

FIG. 9

AR/VR INTERFACE FOR CLIENT/CONTRACTOR COMMUNICATION PLATFORM

PRIORITY CLAIM

This application is a continuation of U.S. patent application Ser. No. 16/423,963 filed May 28, 2019, and titled "AR/VR INTERFACE FOR CLIENT/CONTRACTOR COMMUNICATION PLATFORM," which claims the benefit of priority to U.S. Provisional Patent Application Ser. No. 62/676,622 filed May 25, 2018, and titled "AR/VR INTERFACE FOR CLIENT/CONTRACTOR COMMUNICATION PLATFORM," which is incorporated herein by reference in its entirety.

TECHNICAL FIELD

Embodiments pertain to systems, methods, and component devices for user interfaces and communications, and particularly for virtual reality and augmented reality user interfaces and communications particularly directed to a client/contractor platform and associated user interface and communication systems.

BACKGROUND

Home improvement is an area with a long tradition of limited transparency and accountability between building owners trying to repair or update building spaces, and the many different construction professionals which may be involved in a single project. While standardized computing, communication, and interface systems are used in this environment, such standardized systems do not enable transparency and accountability in an environment where projects have custom aspects and are subject to changes during a project. Additionally, in standard operations, many connections between ideas or products and project tasks in the context of an overall project are obscured or only available to certain subsets of people involved in a project if they are available at all, and so standard communication systems and user interfaces applied to custom home improvement projects fail to capture, store, and make available information relevant to projects.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 9 illustrates aspects of a user interface of a computing device as part of client/contractor communication system operations in accordance with some embodiments.

DETAILED DESCRIPTION

Figure 1:
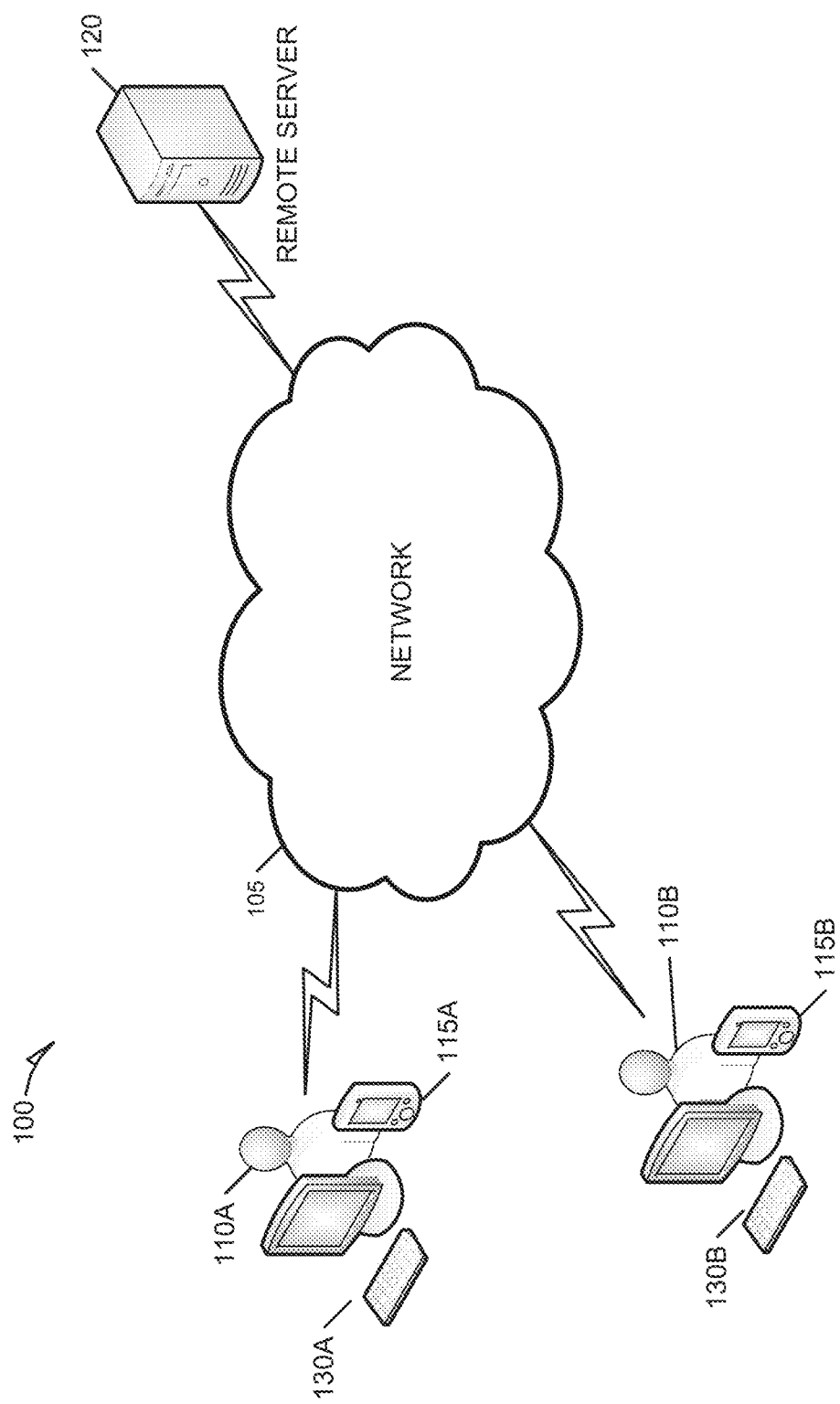
FIG. 1 is a diagram of a network that may be used for a client/contractor communication system in accordance with some embodiments.

The description that follows includes details of user interfaces, systems, devices, methods, and computer-readable storage media related to augmented reality (AR) and virtual reality (VR) elements of systems for client/contractor home improvement management and communications. In the following description, for the purposes of explanation, numerous specific details are set forth in order to provide an understanding of various embodiments. It will be evident, however, that additional embodiments that are not specifically described are also possible in accordance with the present innovations.

Embodiments described herein include AR and VR elements. As discussed herein, AR refers to image or video capture and display, with added or "augmented" computer graphics or display elements added to the captured image or video during display. VR refers to a computer-generated environment. Either or both of these technologies may be used in various embodiments to represent environments associated with a construction project. Interfaces described herein may be used in various ways in AR/VR systems to provide improved project management and imaging in a home improvement and construction environment.

One embodiment of the innovations described herein is the Strukshur™ platform. Strukshur™ is the first user-friendly platform created to allow homeowners and professionals working in design and construction for building projects to work together from ideation through execution, including all communication and file storage on the platform. Strukshur™ connects homeowners and skilled tradesman to their home improvement data.

Existing systems for home improvement lack transparency and accountability. Embodiments described herein for the Strukshur™ platform include transparent and accessible communication and data-storage systems for home improvement. Strukshur™ systems described herein enable a shared vision between professionals and clients by empowering both sides through transparent communication, beginning with project ideation in photos and videos, through bids, estimates, and material ordering and delivery, in a simple, beautiful, e-commerce-enabled digital platform. This platform enables a Strukshur™ community to provide access to localized, reputable professionals for any job, and continues to support the relationship between clients and contractors until the job is complete. Homeowners and professionals work through the design and finish selections—every single detail, every room, and every project—in the client's home or landscape before a nail is hammered.

AR and VR systems may be used to augment such finish selection by providing imaging for finish selection, and this finish selection in an AR/VR environment may then be used by contractors to confirm that the finish selection matches the actual result with verification throughout the project. For example, AR/VR imaging may be used to illustrate a result of a particular project with computer graphic overlays on images of the space to be improved (e.g. AR) or virtual computer models of the space after the constructed improvements (e.g. VR). These environments allow an owner to view multiple different options and select options with images displaying the entire context of the expected final product. When a selection is made, the AR/VR images and files may be propagated through Strukshur™ systems to be automatically integrated with project tasks, milestones, finish detail files, and such. Automatic tasks may be created in the system to match physical products (e.g. paint colors, item surface look, wood-type, etc.) against the AR/VR imaging as part of construction.

For contracting professionals or service providers, the Strukshur™ platform provides a "home away from home" for their business, including a home improvement professional interface with a custom portfolio and systems for associated bid management and of storing of "in-process" construction photos and videos. Every professional may have up-to-date licensing and criminal background data on his or her profile. A greatly improved business development experience may provide a steady stream of qualified leads as well as a suite of best-in-class digital project management tools and legally mandated project file storage. These systems may allow professionals easily standardized access to AR/VR data to make sharing data with other professionals and homeowners seamless throughout all stages of a project, with history of changes tracked in AR/VR files, as well as histories of considered and rejected imaging shown to homeowners recorded in AR/VR files and change histories.

For the homeowner, developer, and do-it-yourselfer, Strukshur™ facilitates clarity and transparency by providing preliminary pricing for labor and materials, helping both clients and professionals answer many questions that arise during various phases of a project. The Strukshur™ platform delivers a global marketplace for vendors to sell their handmade or one-of-a-kind products and services directly to the consumer or to a specifically targeted community of Strukshur™ users.

No prior solution in the market aggregates every aspect and stage of construction or home improvement under one umbrella as Strukshur™ does, from idea boards to design, development, bidding, and execution, in a single robust portal allowing seamless access and communication among all project functions, all of which may be integrated with AR or VR imaging. While certain aspects of some embodiments particularly describe implementations associated with the Strukshur™ platform, it will be apparent that other embodiments are also possible, and none of the described embodiments are preferred over other possible embodiments.

Some embodiment systems present clients with a finish-by-finish and room-by-room automated flow which presents selected finish options, and allowing for imaging of finish options in AR or VR. In some such embodiments, a database of finishes is combined with a room/area taxonomy to generate particular finish selection guidance based on a room/area type identified by a user or by user inputs (e.g. text, image, models, etc.) Such guidance may be integrated with computer models of finishes and associated files for integrating the models with AR or VR files describing the construction environment. Some embodiments enable similar guidance for purchase of an entire pre-fabricated home. In some such embodiments, a pre-fabricated home can include modular elements, and AR or VR elements of a system described herein can automatically visualize the elements of such a modular prefabricated home in different configurations. Some embodiments enable visualization of these elements in lot or site on which the home is to be placed, along with additional systems to confirm that the selected configuration is compatible with the current size and grading of a lot.

In some embodiments, such finish options and the AR/VR files in a system may be selected and made available to users based on system data associated with similar users, based on professional user selections, or based on public or private databases of finish data. In some embodiments, such finish options may be based on contractor or professional designer options that change over time based on market and style trends. In some embodiments, data on user selections and preferences may be received and used to update and filter finish options presented to users as part of the automated project design process. In some embodiments, gamified scoring analysis and metrics are provided as part of the automated project design process. In all such situations, AR or VR imaging may be used to assist in selection of particular products or items (e.g. finishes) for a home improvement construction project.

In some embodiments, project designs include AR/VR environments organized by room or space (e.g. a limited outdoor area) and finish that allow tagging to identify elements of a particular design component or finish as a user preference. Such user preference tags may be used to filter or search additional design options. For example, as detailed further below, in an AR environment, a user may tag particular surfaces or objects with notes on preferences or selections. AR data may then be automatically propagated through the system to be reviewed by other system users (e.g. professionals, sub-contractors, etc.) Similar tagging of finishes by room or space may be performed in a VR environment generated for each room or space.

In some embodiments, communications between users, including various communications between clients and contractors, are batched and organized by a job or project, enabling project-based searches for particular communications.

In some embodiments, following completion or partial completion of a project design process, an automated bid process is presented to a user. Bids may identify individual costs associated with particular finishes as well as overall bid costs. Such bids may additionally identify secondary or associated costs of particular designs such as architectural fees, structural fees, permitting fees, and other such secondary costs not directly associated with a finish object. Some embodiments use a categorized bid sheet so that contractor and subcontractor bids presented to a client are direct comparisons. In some embodiments, following an automated project design process, initial bid communications for projects and project categories and subcategories are generated automatically, and the resulting categorized bid sheet is generated automatically and communicated to client users in response to contractor and subcontractor responses to initial bid communications. Some embodiments additionally include scheduling and process itemization in bid processes. Such itemizations provide information about next project steps and scheduling that may not be otherwise available to clients.

In some embodiments, following completion or partial completion of an automated design process, data associated with the design process may be compared with data on previous designs to generate automated project comparisons and/or automated cost comparisons. Such comparisons may be based on project types, finish types, location, time of year, building details, or any other such data. Such comparisons may additionally provide scheduling estimates based on data from previous projects.

In some embodiments, systems include database information about product/finish costs and allow product-based itemization and ordering of materials. Some such embodiments may, for example, allow multiple AR/VR displays for the same space, with different finishes in each display and associated differences in cost estimates for each display. A homeowner may thus use AR glasses to walk through a space with a first display showing first AR changes to the space associated with a first cost estimate, and then switch to a second display showing second AR changes associated with a second different cost estimate.

User interfaces for the various systems include interface elements to match data associated with any portion of a product with associated elements of drawings, scheduling, materials records, and other such information. Associations between such groups of data, particularly between finish data and tasks, allows direct viewing of finish data within scheduling contexts in a way not known in previous systems, providing improvements that avoid users' navigating through tiers of both material/finish data and scheduling data, and instead create user interfaces which directly connect low-level finish data with associated fine-level scheduling and task information. For example, an image of a countertop in an ideation interface or a countertop surface in a 3D model interface of an AR or VR environment may provide direct links to appropriate countertop materials as well as any other relevant information (e.g. assigned personnel, installation scheduling as a subproject within an overall project context, pricing information, warranty information, material delivery schedules, etc.) Similarly, project schedules and material lists may include links to associated imaging in AR or VR files created during initial stages of the project.

In any processes and systems above, some embodiments may include feedback systems to adjust data presented to future users following completion of a project. After a project is completed, estimates and any other data provided to users during a project may be compared with actual project completion information, and used to update future projections for future projects.

FIG. 1 is a diagram illustrating a networked system 100 that may be used by users such as construction professional or building owner users 110A and B for operations and communications within a system that supports a client/contractor home improvement platform. The networked system 100 is configured to transmit messages between user devices such as mobile devices 115A and B or other client devices 130A and B over a network 105 (e.g., the Internet). The mobile devices 115 may comprise smart phones, network-enabled tablets, laptop computers, phablets, vehicle-integrated computers, wearable devices, or any other such mobile computing machines. For AR operation, some such devices include sensors and input/output modules that may be used to scan the environment of the devices to generate real-time or near real-time augmented imaging of a space with computer inserted changes to the displayed output image reflecting selected improvements as part of a home improvement construction project. VR devices may simply include displays with interfaces for navigation and selection. The other client devices 130 may be more static client devices such as desktop computers, home network devices such as appliances or televisions, or any other such computing devices. These devices include applications, modules, and/or circuitry to enable messages, scan data, pattern data, information related to device actions, and any other information to be communicated between the various devices and a remote server 120.

Figure 2:
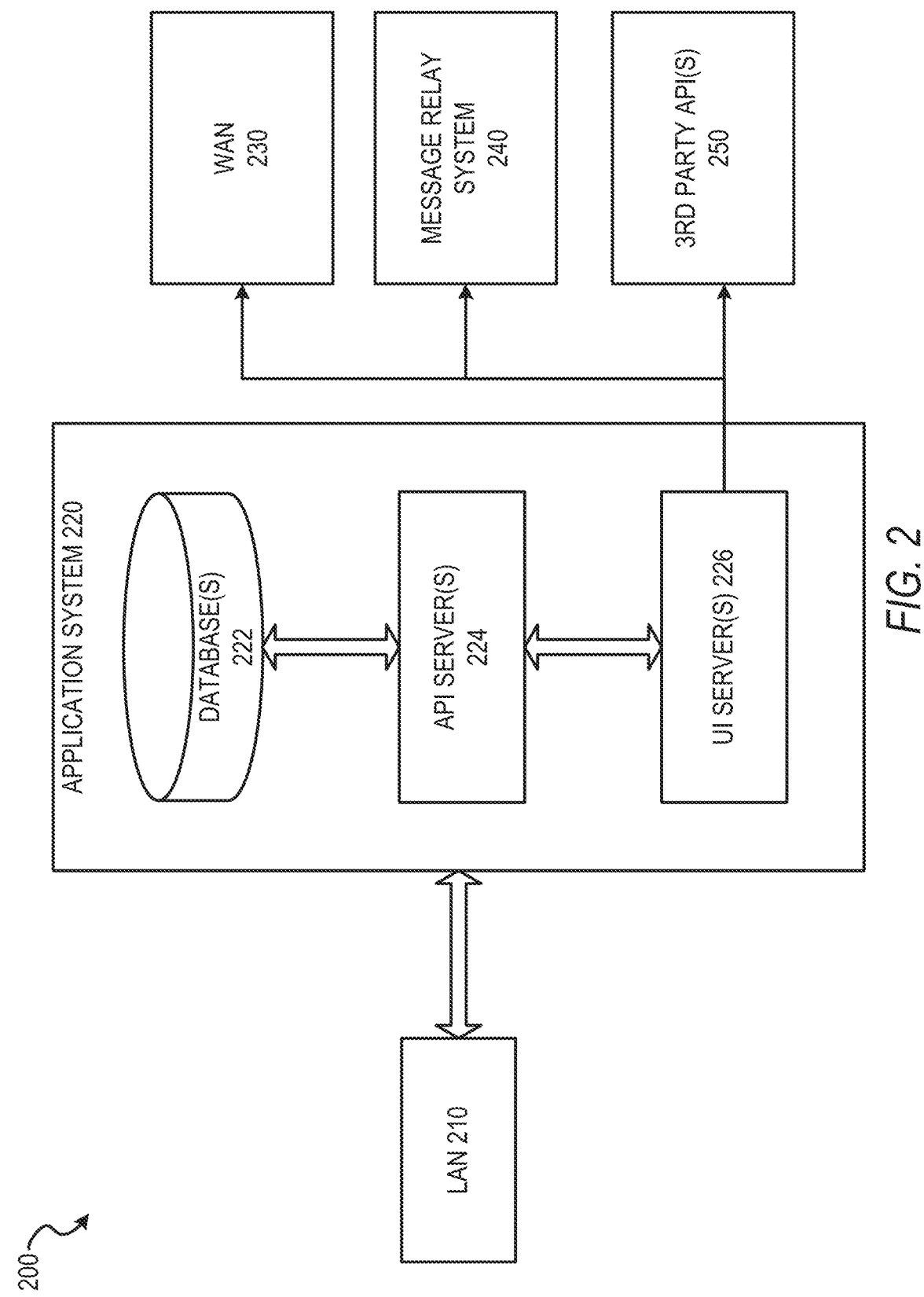
FIG. 2 is a diagram of a network that may be used for a client/contractor communication system in accordance with some embodiments.

FIG. 2 is a diagram illustrating an embodiment of a networked system 200 used to implement a client/contractor home improvement platform in accordance with some embodiments. FIG. 2 illustrates an embodiment system operating on database(s) 222, application programming interface (API) server(s) 224, and user interface (UI) server(s) 226 as part of an application system 220. Such an application system 220 may then interact with other devices in a local area network (LAN) 210 to provide clients and contractors data via a wide area network (WAN) 230 (e.g., the Internet), via message relay systems 240, or via third-party API(s) 250. Thus, as described below, particular user interfaces presented as part of embodiments described herein may be supported by the UI servers 226 retrieving data from other portions of the application system 220 and system LAN 210 to provide data via the described user interfaces via one or more of the WAN 230, message relay system 240, and third-party API 250. For example, in some embodiments, messaging between a contractor and a client may be presented in a UI of a client device 130 (FIG. 1) after the information is received at the client device 130 via the message relay system 240. The same UI for the same client device 130 may also present project chart information and updates received via the third-party API 250, with other supporting information received via the WAN 230. Such information may be aggregated at the client device 130 to present the UI enabling direct selection of various finish pin data (e.g. data associated with any particular element of construction within a platform), subproject indicator data (e.g. data associated with a particular portion of a project within a platform, including portions of a project for creating or installing particular finishes, as well as any other particular initial or intermediate portion of a project), and other related data within the UI presented on the client device 130. Any such UI information may be presented in either an AR or VR environment.

Figure 3:
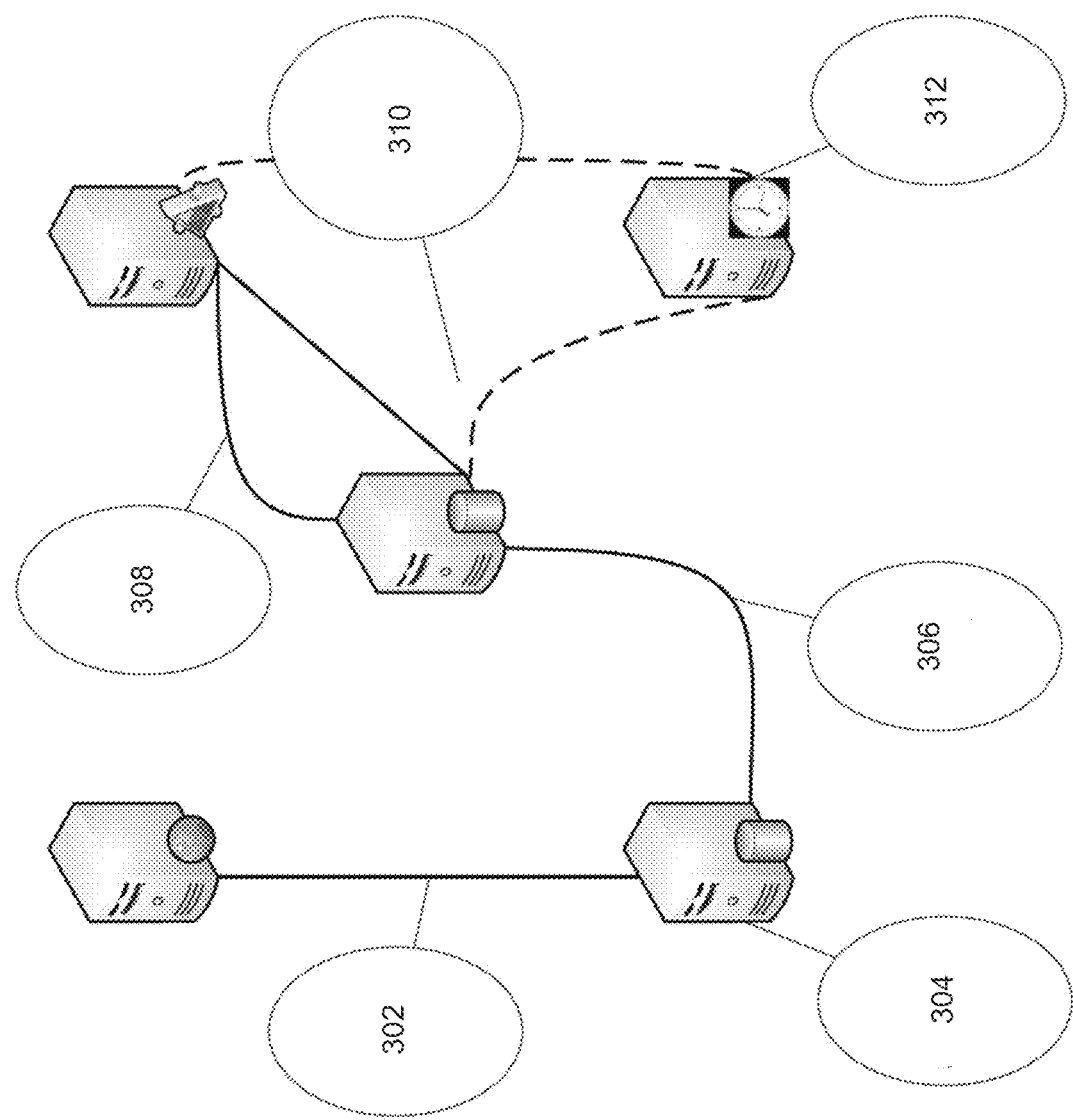
FIG. 3 is a diagram of a network that may be used for a client/contractor communication system in accordance with some embodiments.

FIG. 3 further illustrates aspects of a client/contractor home improvement system in accordance with some embodiments. FIG. 3 illustrates systems for operating, managing, and updating a system, as well as providing client and contractor users with access to the system and data from the system and related system services, with an example system flow for data updates within a client/contractor home improvement platform in accordance with some embodiments. In operation 302, a data change triggers an interaction with a system API. In operation 304, associated records are assembled from a database into a proper format. In operation 306, the assembled data call is written to a simple queue service (SQS) queue. Various combinations of operations 308, 310, and 312 then occur depending on the particular communication and data presentation. In operation 308, a data call is made from the queue record. In operation 310, if a successful acknowledgment of the data call is received, then the associated queue record is removed from the queue. If a communication is lost, or not acknowledged within a timeout period or other timed process, operation 312 attempts to rerun any associated current queue records impacted by the lost communication. Such operations may be used for various different systems within a client/builder system in accordance with various embodiments described herein, including calls for data to be presented in a UI, and updates, additions, or other changes to various finish pin data and subproject indicators as part of a project chart.

Figure 4:
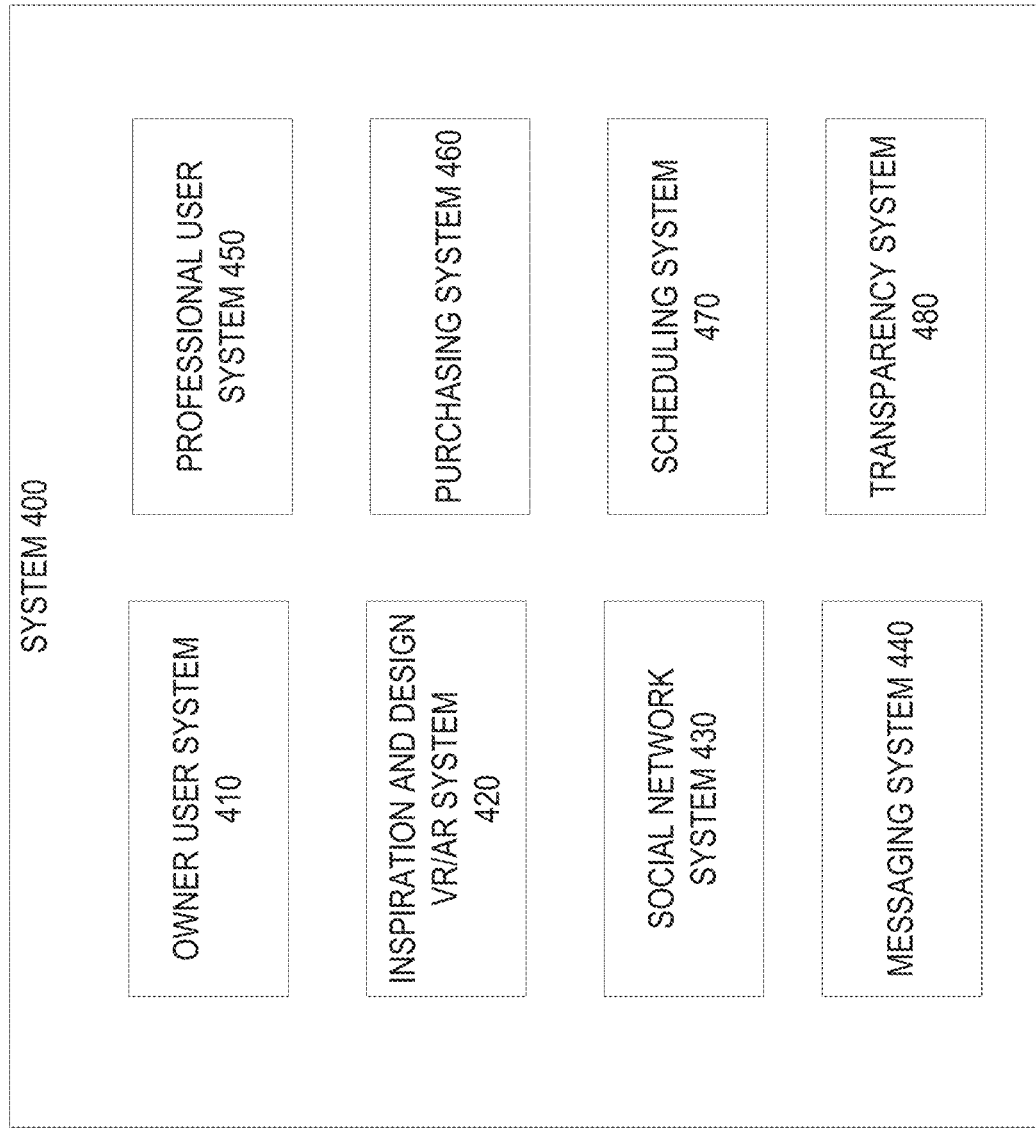
FIG. 4 illustrates aspects of a client/contractor communication system in accordance with some embodiments.

FIG. 4 illustrates aspects of a client/contractor communication system 400 in accordance with some embodiments. As described above, embodiments herein relate to client/builder systems for improving project ideation (e.g., the process of finalizing a project with specific finishes from one or more concepts for a physical space), management, and communication. As part of such systems, the client (e.g., property owner) and the builder(s) (e.g., construction professionals, such as a general contractor and one or more subcontractors) each have different roles within the project. The client/contractor communication system 400 includes various systems for clients/owners and professionals/builders, as well as systems to gather and integrate information as part of construction projects. The client/contractor communication system 400 thus includes a variety of subsystems or modules that may be implemented on various devices as part of a client/contractor system described herein. The embodiment of FIG. 4 includes an owner user system 410, an inspiration and design VR/AR system 420, a social network system 430, a messaging system 440, a professional user system 450, a purchasing system 460, a scheduling system 470, and a transparency (e.g., recordkeeping) system 480. In some embodiments, a single set of structures is created to enable all of these systems. In such systems, a single login may be presented to a user, with different options presented based on profile information for particular projects identifying a user as either an owner or a professional. In such systems, a single user may be an owner for one project, and a professional for another project.

The owner user system 410 provides an interface and communication systems for a property owner, with structures to initiate and approve changes, costs, and finishes, as well as notification systems to provide the owner user system 410 information regarding scheduling and professional project assignment changes during a project. For example, when a certain milestone is reached in a project chart, the owner user system 410 may enable automatic messaging regarding the milestone. The owner user system 410 may additionally allow gathering and collection of inspiration and design by generating an inspiration page with finish pin data including 3D models, photos, videos, and other such data. 3D models and images in particular can be configured for use in AR or VR systems which include models of a project. The owner user system 410 may include systems to assist with decision making as to whether or not a professional is needed to complete a project, and to provide estimates for pricing, material, and labor before the bidding process begins. As part of project generation, the owner user system 410 may create purchase lists and schedules of finishes for each space (e.g., including rooms, outdoor spaces, etc.). The owner user system 410 may facilitate the bidding process using a uniform bid sheet to create a standard format for comparison between bids. When professional users are being considered, the owner user system 410 enables review of license information and ratings via the social network system 430, as well as video profile information and project history from a professional user gallery. In some embodiments, automatic image searching may be used to match details of the professional's project history and profile information with ideation inputs or finish pin data provided to the system by an owner. The owner user system 410 may additionally allow an owner user to see the team that the general contractor considered for a project usually works with from the professional user profile, to help in selection of a professional. Additionally, the owner user system 410 may provide interfaces for all other aspects of the system, including initial assistance with project contracts, budget and schedule tracking, and end-of-project rating of professionals.

The professional user system 450 is enabled with systems to indicate assigned project/subproject status, to update information with a project the professional is working on, and to provide management tools for scheduling various different projects. Depending on the particular project and the system, the professional user system 450 may share some overlap of control options for providing documentation for various aspects of a system, and may have the ability to upload documents to various other systems such as the inspiration and design VR/AR system 420, the purchasing system 460, and other such systems. These systems may further include contact lists with teams of professionals and subcontractors, messaging functionality for various teams, and options for professionals to see other professionals' information for industry updates, in addition to options for interacting with owner users as part of bidding and project operations.

The inspiration and design VR/AR system 420 provides tools for both the owner user system 410 and the professional user system 450 to provide data (e.g., images, video, as well as AR/VR features and files) regarding ideas for a particular project, as well as imaging and models of various parts of a project. Additional details regarding inspiration space and data associated with creating finish pin data that may be used in a project are described below. Further, the purchasing system 460 may be integrated with the inspiration and design system 420 to enable purchasing of products associated with ideation data, or to import data for potential purchases into the inspiration and design VR/AR system 420. For example, images or any descriptive information placed in inspiration and design VR/AR system 420 may automatically generate an associated text and/or image search for products similar to ideation concepts illustrated in inspiration and design system 420. For example, an image of a bedroom with the associated text "love this bed" posted to an ideation page for a project may be stored as part of an inspiration and design system, with an automatic performance of an image search by purchasing system 460 for beds for sale similar to a bed shown in the image. Authority for purchasing may be placed in either owner or professional accounts associated with a project, depending on user settings. In some systems, the inspiration and design VR/AR system 420 enables automated gathering of videos and photos from other sources based on user preference selection or image searching. This system may additionally include 3D modeling systems integrated with finishes as described below to allow selection of every finish for a project, with input of dimensions into a 3D model to create purchase lists and quantities needed for items represented in the model. Interfaces for owner users to interact with design professional users via messaging and commenting on images and projects in a professional gallery are presented in some embodiments. Further still, idea boards in such a system may be linked to other general user accounts (e.g., friend accounts) within a system for feedback prior to finalizing inspiration and design ideas into a project that is ready for bidding. Such information may be further linked with specific tasks and tasks schedules, to allow a user interface with direct connections between a 3D model element (e.g. in an AR/VR images), professionals assigned to work with a portion of the project associated with a particular 3D model element (including associated social network information), and any other such finish and task scheduling information.

In some embodiments, inspiration and design AR/VR system 420 can include systems to model and image different configurations of a prefabricated home or modular elements of a modular preconstructed home. Inspiration and design AR/VR system 420 can thus allow visualization of an entire prefabricated home along with interior elements and finishes, and connection of additional data about preferred options or decisions to be made as part of a project. Various options can be adjusted and configurations of the prefabricated home visualized in different configurations, along with information about availability of the parts for the preconstructed home or various finishes, and details about the instructions for construction of a prefabricated home in different selected configurations that are being visualized in an inspiration and design AR/VR system 420.

The social network system 430 may be integrated with the inspiration and design AR/VR system 420 to enable various users to share ideas, and to find matches between owners and professionals based on shared or preferred information reflected in information associated with each user in the inspiration and design AR/VR system 420. This system may enable professionals to provide example AR/VR data for previous projects. This also enables multiple people to view project information in an AR/VR environment and to modify and. The social network system 430 may also include details on past projects, as well as references, specialized skills or preferences, and any other such information to assist with selection of professionals for particular projects or subprojects.

The messaging system 440 enables messaging any other user in the system about anything, with options to sort and group messages by projects, teams, or leaders, or in any other such batch email operations. Files, photos, and videos for a project may be messaged within a system, as well as AR/VR image and model information associated with system 3D modeling of a project, and confirmation of selections within a modeled project as part of messaging between an owner and a professional user as part of a project. In some embodiments, the capability for direct video streaming within the system is part of the messaging system 440 for project monitoring and security.

Scheduling system 470 may be used for identifying tasks, generating project charts and schedules, and linking this information with other project information. User interfaces in a system enable direct access between scheduling, purchasing, inspiration, social network, messaging, documentation/transparency, and other aspects of the system. For example, as further detailed below, the scheduling system 470 may be integrated with the inspiration and design VR/AR system 420 to automatically generate and update project charts and subproject indicators based on final designs from the inspiration and design VR/AR system 420, which can include automatic changes to the VR/AR visible model of the system that tracks the appearance of the project at certain deadlines. The scheduling system 470 may additionally be used to automatically schedule multiple projects for particular professionals and as part of scheduling aspects of the bidding and acceptance of a particular construction project. For example, if a single professional user is associated with multiple projects, scheduling system 470 may use any information from all projects to schedule the professional for all projects without conflicts. Additional details of some such embodiments are described below.

The transparency system 480 includes integration with the owner user system 410 to enable viewing by owner users of operations in real time as professional users provide project updates. Such systems may also include communication boards to subcontractors and professional accounts for group communications. Transparency systems 480 include approval systems for purchasing and final approval of finishes, with AR/VR imaging and other verification options based on user settings, and bidding and pricing visible to the owner user. Additionally, messaging prompts may be set based on project milestones or periodic timing triggers to prompt the professional users for a project to engage regularly to move a project forward and provide expectations for transparent and regular communications. Further, scheduling associated with particular finishes may be made visible via project charts and subproject indicators, and tied via a user interface to particular product/finish information. In some embodiments, scheduling and professional assignment to particular subprojects may also be visible. Further still, preliminary pricing and final pricing, with options for explaining variations, are visible in some embodiments, to allow transparent pricing of products used in a construction project.

In accordance with various embodiments described herein, links are stored in system databases (e.g. tables or relational database entries) to create direct relationships between low-level information associated with each of these systems. An inspirational image may thus be connected to an element of an AR/VR 3D model, a subcontractor with associated expertise, a task in the context of the project, a subproject indicator with a particular schedule in the context of a project chart, purchase information for related materials, and any other such information. User interfaces in the system enable direct access between this information without the need to navigate individually through each system using the links between the associated low-level elements of each system, thus providing improvements on previously known systems.

Additional aspects of such systems will be apparent in view of the descriptions and user interfaces for various embodiments described below with respect to FIGS. 7-13, 15-17, and 19A/B-20.

Figure 5:
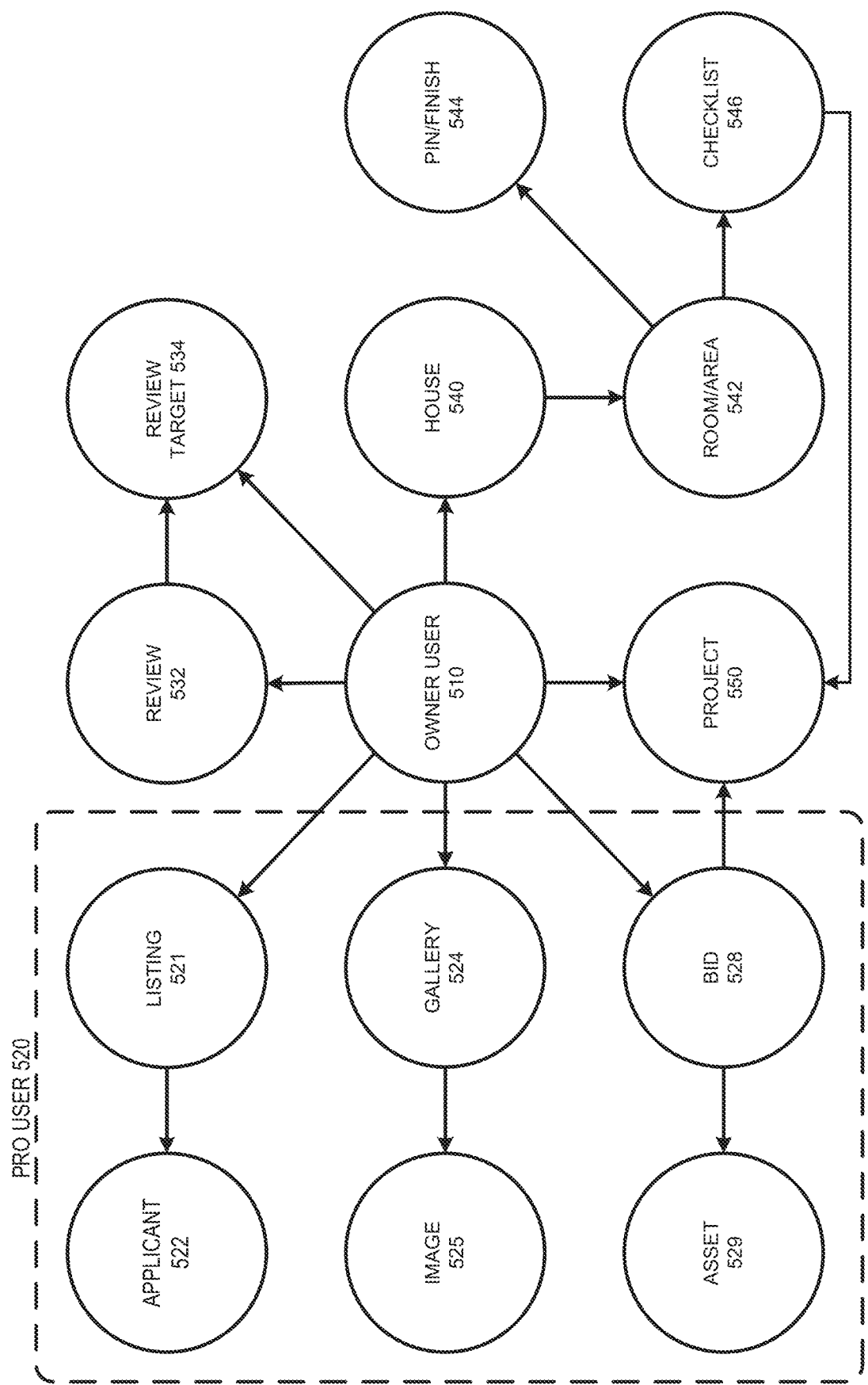
FIG. 5 illustrates aspects of a client/contractor communication system in accordance with some embodiments.

FIG. 5 illustrates aspects of a system for presenting information to different users as part of various projects within a system in accordance with some embodiments. FIG. 5 illustrates how an owner user and a professional user may interact with various aspects of a system. As illustrated, a user may interact with a system to register and provide information about the user. Such information identifies user projects and whether the user is a professional/contractor user expecting to bid on contracts or subcontracts for other client users. After a user has registered with the system, the initial registration information provides different options to a user. Client users can create new projects or review and update existing projects. Professional users (e.g., contractor or builder users) may generate or review data for bids or job listings, or may review different image galleries or AR/VR environments for projects. Different users may additionally review any information available for their own projects or publicly shared projects of other clients, and may communicate with other system users.

For example, an owner user 510 may provide data associated with a house 540, where the house 540 has multiple identified rooms/areas 542. AR/VR imaging for the project may be a single file for the entire project, or different files or interfaces for each room or space. Ideation for each room/area 542 may result in finish pin 544 data for each room/area 542. Each room/area 542 may additionally have a checklist 546 flow with associated finish pin data that, when complete, results in a project 550. Basic AR/VR files to show an initial imaging of a project may be generated in response to completion of a checklist 546 flow. When the owner user 510 has a finished project, the owner user 510's project 550 may be made available for a pro user 520 to place a bid. The project 550 may be posted generally as a listing 521 for the pro user 520 to reply to with an application, or the owner user 510 may specifically pick the pro user 520 and submit the project 550 directly to the pro user 520 for a bid 528. The pro user 520 may have a gallery 524 of prior work or ideas with images 525 in the system. The owner user 510 may review the gallery 524 and image 525 data to gather information about the pro user 520. When the pro user 520 responds with the bid 528 for the project 550, assets 529 such as subcontractor information, material information, or other such data may be used to respond as part of the bid 528 response for a particular project. Comments on initial AR/VR imaging may be provided, along with recommended changes. Additionally, as part of networking aspects of a system, review 532 data may be submitted to a system, and associated with to a review target 534 (e.g., the pro user 520 or another target of a particular review, such as a vendor, a product, a subcontractor, or any other reviewable aspect of a project). This review information may then become part of a system, either as part of a gallery 524 for a user, or in another review system.

Table 1 describes additional operations and functionality available to different user types in different registration states in a system in accordance with one embodiment of a system:

TABLE 1

| Description | Non-Authenticated User | End User | Pro. User | Staff User | Admin. User |
| --- | --- | --- | --- | --- | --- |
| User can view published public content | X | X | X | X | X |
| User can Register | X | | | | |
| User can login via Social Sign On | | X | X | | |
| User can login via local user account | | X | X | X | X |
| User can recover lost password | | X | X | X | X |
| User can view gated content | | X | X | X | X |
| User can setup (create, update, remove) their house/rooms | | X | X | X | X |
| User can setup (create, update, remove) pin boards for each room | | X | X | X | X |
| User can select from a gallery of pre-populated photos | | X | X | X | X |
| User can upload new photos to boards | | X | X | X | X |
| User can tag photos against system/room taxonomy | | X | X | X | X |
| User can share photo boards | | X | X | X | X |
| User can review and update project checklists | | X | X | X | X |
| User can request professional bid for room/house | | X | X | X | X |
| User can shop for products | | X | X | X | X |
| User can browse products by category | | X | X | X | X |
| User can search for products | | X | X | X | X |
| User can upgrade to a professional account | | X | | | |
| User can upload or link to project plans | | X | X | X | X |
| User can input room dimensions | | X | X | X | X |
| User can setup (create, update, remove) a professional profile | | | X | X | X |
| User can submit a background check | | | X | X | X |
| User can setup (create, update, remove) service area | | | X | X | X |
| User can setup (create, update, remove) portfolio gallery | | | X | X | X |
| User can upload insurance documents | | | X | X | X |
| User can submit payment for subscription services | | | X | X | X |
| User can browse employment forums | X | X | X | X | X |
| User can post job listings | | | X | X | X |
| User can apply to job listing | | X | X | X | X |
| User can review professional bid requests in service area | | | X | X | X |
| User can upload or link to bid assets | | | X | X | X |
| User can create and submit bid for end user project | | | X | X | X |
| User can submit request for sub-contract bid | | | X | X | X |

TABLE 1-continued

| Description | Non-Authenticated User | End User | Pro. User | Staff User | Admin. User |
|---|---|---|---|---|---|
| User can review professionals' bids | | X | | X | X |
| User can select preferred project bid | | X | | X | X |
| User can message selected professional | | X | | X | X |
| User can message project client | | X | | X | X |
| User can mark project as completed | | X | X | X | X |
| User can review professionals | | X | | X | X |
| User can moderate (update, remove) reviews | | | | X | X |
| User can setup (create, update, remove) end users | | | | X | X |
| User can setup (create, update, remove) professional users | | | | X | X |
| User can setup (create, update, remove) staff users | | | | X | X |
| User can setup (create, update, remove) administrators | | | | | X |
| User can moderate (update, remove) photos | | | | X | X |
| User can moderate (update, remove) bids | | | | X | X |
| User can moderate (update, remove) professional profiles | | | | X | X |
| User can impersonate (login as) user | | | | X | X |
| User can setup (create, update, remove) product gallery | | | | X | X |
| User can run pre-built reports | | | | X | X |
| User can view administrative dashboard/screens | | | | X | X |
| User can moderate (create, update, remove) job listings | | | | X | X |

Table 1 illustrates aspects of one embodiment with different user systems, where computing devices and associated user interfaces as described herein are provided to enable a particular client/builder platform. Other embodiments may use different combinations of such systems, such that the functionality described above may be available to different combinations of users than those described in FIG. 1 in different embodiments.

Figure 6:
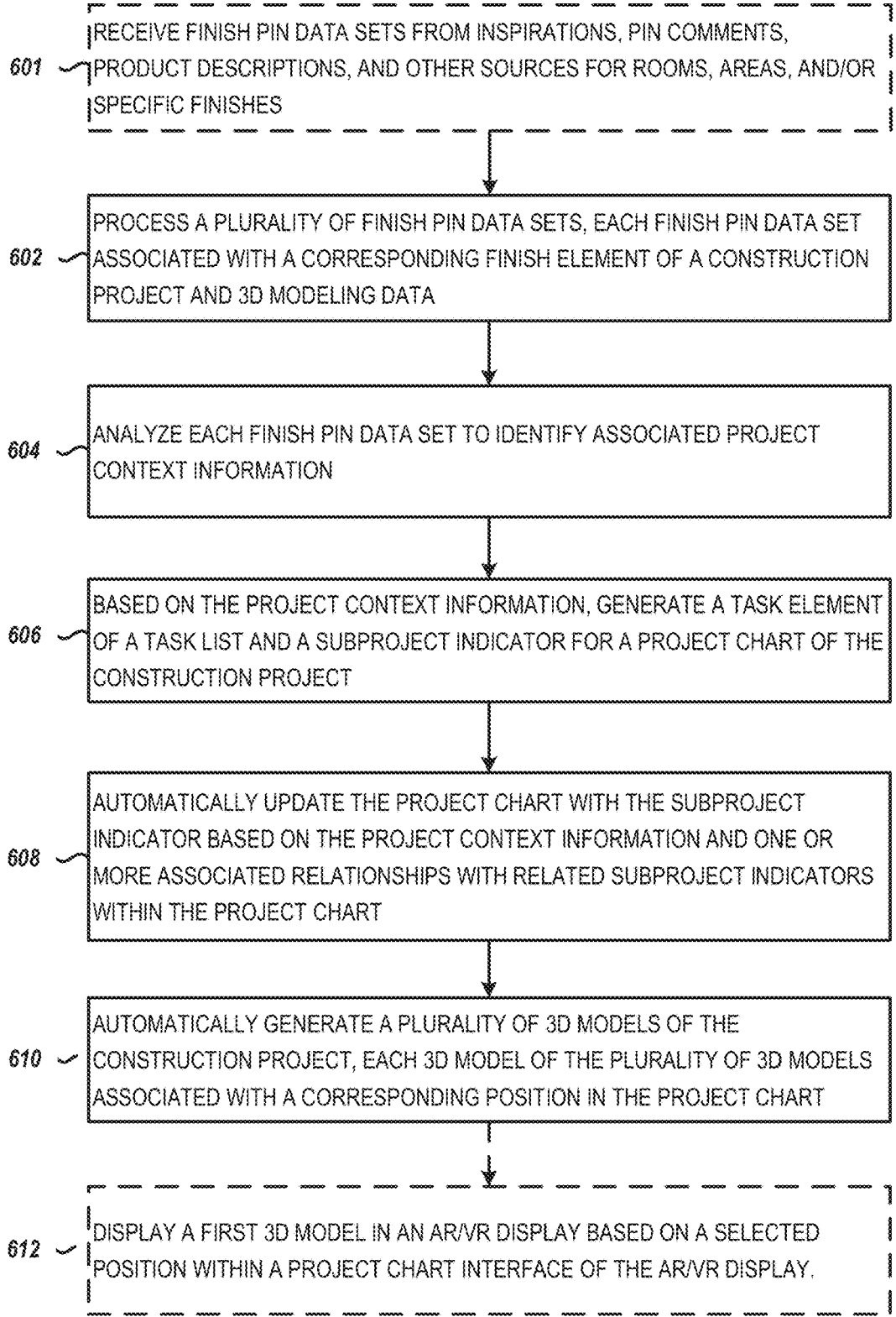
FIG. 6 illustrates a method performed by a computing device for client/contractor communication system operations in accordance with some embodiments.

FIG. 6 illustrates a method 600 for a client/builder system in accordance with some embodiments described herein. In some embodiments, method 600 is implemented by a device comprising a display, a memory, and one or more processors. In other embodiments, method 600 is represented by instructions stored in a computer readable storage medium that, when executed by one or more processors of a device, cause the device to perform the operations of method 600.

Method 600 begins with optional operation 602 of a system receiving or generating finish pin data sets. Such data sets may be received via network communications, user inputs, or any method selectable by a user to identify the finish pin data. Such data, as described herein, may include images or data within AR or VR files, user text comments, drawings, or any other such information. This includes 3D modeling data for aspects of some finishes, which may include texture data, shape data, and partial model data describing how the shape and appearance of a finish changes as it is being build. Such data can be associated with subproject indicators as described below.

In some embodiments, the selected data can involve modular elements of a home selected as finish data for a construction project. Such data can be a design of a prefabricated home or a home design available for order via a system. Selection of such a home or modular elements of a home can have associated finish elements within the selected home, and so as described herein, certain finish pin data sets (e.g. for a particular home design) can have additional finish pin data sets within the data, as well as information about how different modular elements fit together. A project may thus have information selected from a store or inspiration and design interface to select a pre-designed building or pre-designed modular elements of a building that can be identified as part of a construction project, with a variety of arrangement and finish data included in the finish pin data sets used by a system. The 3D model data for all such information (e.g. building elements and various finish data for buildings, parts of buildings, walls, interior fixtures, etc.) can be integrated into an AR/VR system as described below, and used to create multiple AR/VR models at different stages of a project. The system can enable adjustments to the design and automated updates to the AR/VR models and associated project plans as part of system operation.

In operation 604, a system receives and processes a plurality of finish pin data sets, each finish pin data set associated with a corresponding finish element of a construction project. Data may be stored in one or more databases and presented or prepared for presentation in an AR or VR user interface as part of this operation. Then in operation 604, each finish pin data set is analyzed to identify associated project context information. For example, an image that is part of a finish pin data set may include image elements directly associated with a project and other extraneous elements. An image provided to show wall color which also includes flooring may be processed to gather data on the relevant wall color while ignoring the irrelevant floor information. Text information or other indications may be used to determine relevant context information against irrelevant information. Additionally, associations such as finish pin data structure or placement in a particular room or area taxonomy may be used for such determinations. Additional context information may be provided directly by a user. In some embodiments, if the data is not already part of an AR or VR file, the finish pin data may be used to automatically generate or update AR/VR files for imaging of a space based on the finish pin data.

Based on the project context information, a task element of a task list and an associated subproject indicator for a project chart of the construction project are automatically generated in operation 606, and in operation 608, task lists and project charts are generated or updated as appropriate using the information from operation 606. This involves operations to automatically generate the project chart with the subproject indicator for at least a first finish element based on the task element and the project context information and one or more associated relationships with related subproject indicators within the project chart.

In operation 610, a plurality of 3D models are generated and each model is associated with a position in the project chart. Such 3D models can include modeling for all aspects of a project, from the initial state with nothing complete, to the final completion with all finishes. Various intermediate models show a partially completed project, with each model associated with a particular position in the project chart. As part of automatic creation of such models, the 3D model data for different finishes is added to a model based on the subproject indicator for the finish, and the portions of the model can be built tracking the subproject milestones in the project chart. Further, in operation 612, a project chart interface can then be used to select a particular 3D model associated with a position in the project chart, to allow a user of an AR or VR system to visualize how the project will look at a particular point during the project. In some embodiments, the project chart interface is a timeline. The timeline can include points or indicators showing where different 3D models are available. In other embodiments, the project chart interface is a copy of the project chart with a 3D model interface element or a selectable piece of text in the chart that brings up an AR or VR display including the 3D model data for the project at the corresponding state of the project associated with the selected element. As a project is in process, use of intermediate 3D modeling to show currently selected finishes at different stages of a project can indicate to a user the next set of decisions that can halt a project if they are not made, or can give a user a sense of when a final time to adjust certain selections is by indicating the position and order within the project that a finish is made permanent (e.g. is completed as part of the project flow). For unselected finish elements, various embodiments can include additional operations, such as operations to automatically recommend additional elements to complete a project bid request based on project data list templates and project taxonomy structures within the system. This may allow, for example, a system to automatically identify elements for a project based on area types. If a construction plan for a kitchen area is missing a sink finish, for example, a prompt for additional information (e.g. reusing existing finish so no purchase needed) or selection of finish pin data associated with the missing finish may be presented. Similarly, as part of client/builder platform operations, the system may proceed with operation 612 to generate and submit project bid requests to builder users, with the bid request including finish elements, task elements, and any other relevant information. Further system operations may include automated searching to recommend additional or compatible data for existing or missing finishes and finish pin data sets, recommending particular team members or subcontractors for a project based on finish pin data, identified task or projects schedules, or any other such information. All of this information can be visualized in multiple 3D models and accessible via a project chart interface as described herein.

For embodiments involving pre-designed homes or pre-designed modular elements of a home, a design system can allow selection of a design or modular selection and integration of elements of a home to create an initial project, with selection of certain finishes included as part of the home design. In some embodiments, such pre-designed homes or home elements can be selected and identified for purchase through a system. Design elements used to connect or couple different modular elements can be automatically included based on positioning of the modules within a system (e.g. wall connections, door positions, structural support for different arrangements of modules, etc.). Such a system can provide significant details of construction instructions, 3D models for a home, finish options, expected project scheduling data for a project chart, material availability, and other such information. Once the basic structure (e.g. placement of modular home elements) is selected, associated data for an initial 3D model can be created, with placeholder data for finishes that need to be selected. As finishes are selected and added to a project, this information can be integrated into the plurality of 3D models created for various stated of the project. When a user views a 3D model via an AR or VR display, certain elements can be flagged with placeholder finish pins to identify design decisions remaining to be selected.

Some such embodiments may further operate to receive a selection for a first space, wherein the construction project is associated with the first space; access a project data list template associated with a space type for the first space, the project data list template comprising a plurality of finish elements, the plurality of finish elements comprising the first finish element; and prompt a user to provide missing finish pin data sets for the plurality of finish elements of the project data list template, wherein the project data list template is based on a project taxonomy with finish elements selected for each space type within the project taxonomy. The user interface for such prompts may be presented within an AR/VR environment. For example, in one embodiment, a user wearing VR glasses may be shown a VR version of the construction space. During selection of each element, a preliminary selection may be shown in the VR space, with the space changing as the user changes the selection. As the user continues through different prompts (e.g. different elements of a list template), all selections are shown in the updated VR display.

In another embodiment, multiple VR images of the same space may be shown to the user at the same time within an interface to enable a user to concurrently view multiple preliminary finish options before a finish option is selected. Such imaging may, for example, be presented as tiled displays within a display space, with each tile showing a different version of the 3D model or image (e.g. VR/AR environment) of the space.

Some such embodiments may operate to automatically generate an initial version of the project chart in response to receipt of the missing finish pin data sets for each finish element of the project data list template. Further such embodiments may automatically generate a project bid request in response to receipt of the missing finish pin data sets, the project bid request comprising the plurality of finish elements and the initial version of the project chart with the related subproject indicators. In some such embodiments, a response is received from builder users, and the system processes a project bid response, the project bid response comprising at least a cost value and one or more timing adjustment values associated with the related subproject indicators of the project chart.

When product or images searches are performed as part of system or device operations, the system may update finish pin data sets with search results such as product purchase data, warranty data, and delivery data for the first finish element in response to a product selection or search compatibility with finish pin data. Such finish pin data may then be used to automatically generate AR/VR file updates to allow AR/VR imaging to reflect the details of the particular finish.

Once a project bid and response has been settled, various messaging and alerts may be implemented as part of system operations. For example, a system may generate one or more automated messages associated with timing elements of the related subproject indicators of the project chart matching a current clock time of the device. Different AR/VR imaging showing intermediate project stages may be associated with different subprojects and project timings. Such imaging may be generated automatically based on finish pin selection and system templates and histories for given subproject types. The system may also store any message data or change information in a database as a complete record of construction project changes. In one such embodiment, a system is configured to process a user input associated with a change in one or more finish elements associated with the construction project; and in response to the user input, automatically generate a change request, the change request comprising an updated project chart based on the change in the one or more finish elements. Any associated changes for assigned team members, tasks, or other information changes may also be propagated through the system. In some embodiments, confirmed changes to AR/VR imaging of a project may be used to generate change requests and propagate them through the system automatically. In one embodiment a system may receive a confirmed update to the placement of a first finish element within the AR/VR project model; and automatically generate a change request communication in response to the confirmed update to the placement, the change request communication comprising a request for a change request quote associated with a cost and at least one timing change to the project chart. Any associated changes to scheduling and personnel may also be automatically initiated or confirmed with system messaging.

Once a subproject or task is complete, the system may process a completion message associated with a first subproject indicator of the project chart, and in response to the completion message, automatically generate one or more communications for at least a second subproject associated with a second subproject indicator dependent on completion of a first subproject associated with the first subproject indicator. For a 3D model associated with a subproject within a project chart, a completion message can be used to automatically update information associated with the 3D model to indicate that the work associated with the 3D model is completed and fixed, or that changes to the project involving the 3D model elements will involve changes to work that has been completed, with associated costs and impacts on the project. A corresponding status for the first subproject indicator and the second subproject indicator may then be updated, with additional messages and changes propagated through the system. In some such embodiments, documents comparing the initial AR/VR imaging with the result are automatically scheduled and requested as part of a project milestone, with system prompts to input images of the final product for automatic inclusion with AR/VR imaging in an automated message.

In some embodiments, as charts, data, finish pin data sets, VR/AR models reflecting a current approved project, and other information is updated, each change is tracked and stored by the system as a record of a project. For example, as a project chart is updated based on finish pin changes or other updates, a system may store data for each iteration of the project chart along with each associated bid response, bid acceptance confirmation, change request, change request quote, and change request approval; and then automatically generate a final project report comprising the data for each iteration of the project chart in response to a completion notification for a final completion indicator of the project chart.1

Figure 7:
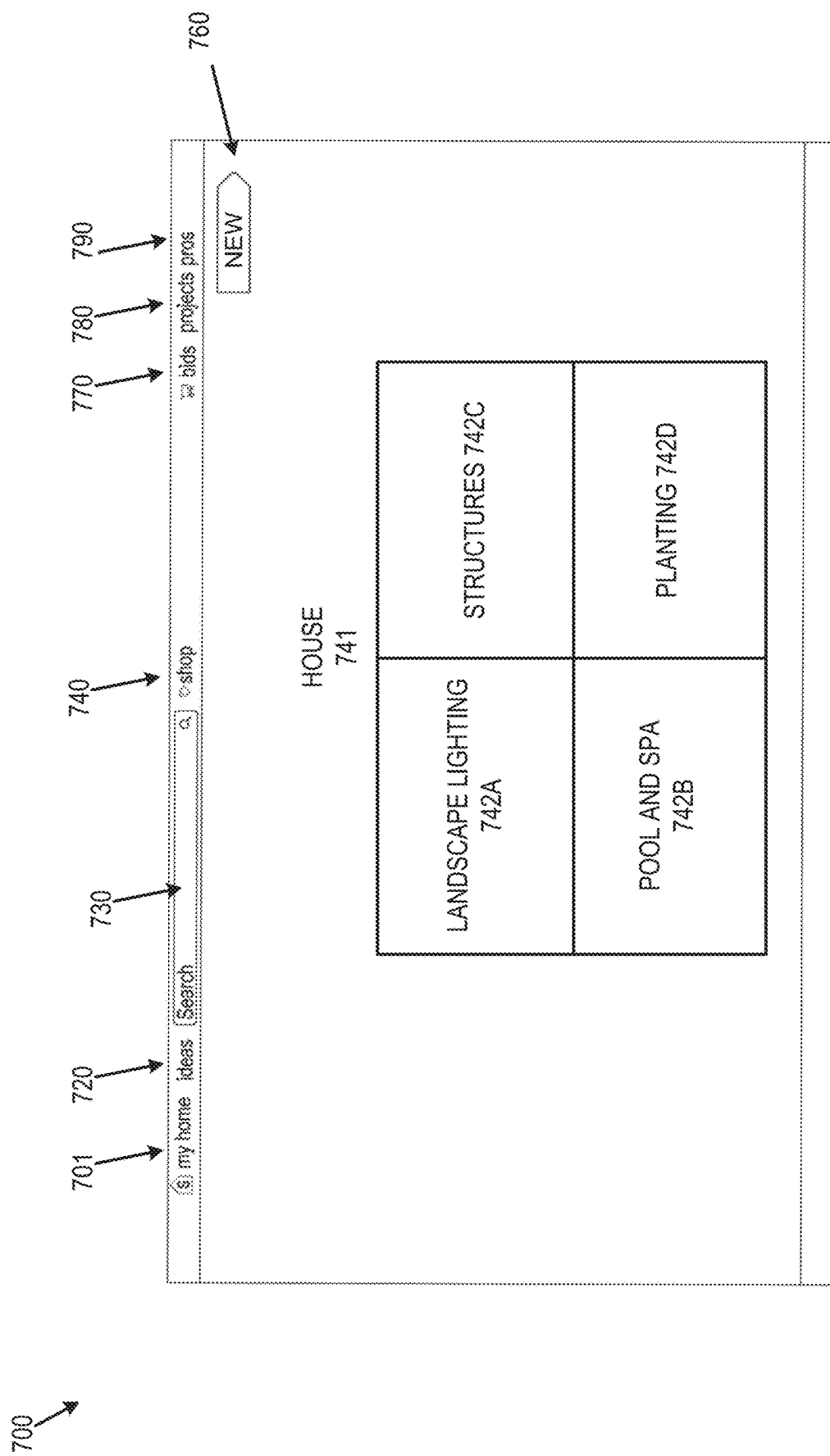
FIG. 7 illustrates aspects of a user interface of a computing device as part of client/contractor communication system operations in accordance with some embodiments.

FIG. 7 then shows a user interface 700 which operates as one portion of an interface system for a client/builder platform in accordance with some embodiments. Such an interface system may enable users to navigate among the various systems described in FIG. 5 in some embodiments. A "home" interface element 701 may lead to an interface 700 or similar interfaces shown in FIGS. 8 and 9. An ideas user interface element 720 may lead to a general gallery interface or a gallery of pin finish data, such as the one shown in the user interface of FIG. 7. Such an interface may also include galleries of multiple different AR/VR visualizations of a space reflecting different space options, or AR/VR visualizations of other spaces that a homeowner wishes to use as an inspiration for a project. A search user interface element 730 may enable text or image searching within a system and also across a WAN. A shop user interface element 740 may access purchase areas for direct purchasing of product as part of a project within the system, and may be integrated at least in part with data for products that is also searched using the search user interface element 730. A bids user interface element 770 may lead to an interface such as the interface of FIG. 15. A projects element 780 may lead to an interface such as the interface of FIGS. 19A-B. The "pros" element 790 may lead to a gallery of professional user prior projects, references, certification or qualification information, or any other such information, including an interface such as the interface of FIG. 17.

In one such embodiment, when a user initially creates an account in a system, an interface similar to interface 700 does not include any area elements. Selection of new element 760 generates a new area (e.g. areas 742A-D) associated with a project. (e.g. house 741). In some embodiments, any number of areas may be added to each project, with an interface adding an additional area element for each newly added area, and a scroll option utilized when the number of areas exceeds the available user interface space given a minimum or set size for each area element.

Figure 8:
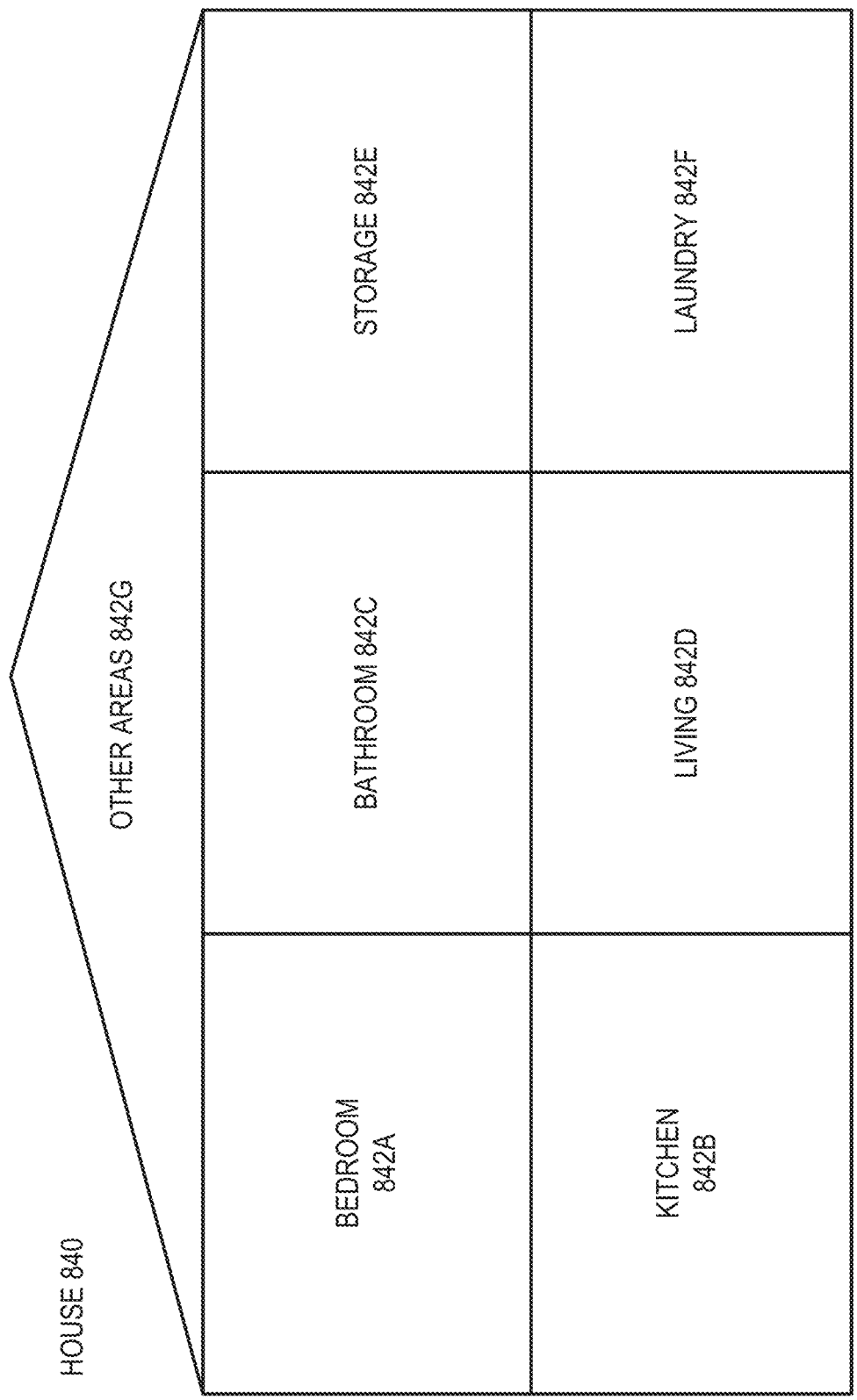
FIG. 8 illustrates aspects of a user interface of a computing device as part of client/contractor communication system operations in accordance with some embodiments.

FIGS. 7-9 illustrate aspects of a user interface for selecting different areas that may be part of a single construction project. For example, when an owner user provides information for a building, each room or area may be associated with a different area selection within a user interface. This may include both interior rooms and exterior rooms, as well as spaces particularly selected by a user that may include a portion of a room, or a surface or other structure (e.g., a wall, a roof, a garden area, a pool, etc.). After the owner user provides this information, separate ideation and finish pin galleries for each area may be created. FIG. 7 illustrates a user interface for four external areas 742A-D of a house 741. Each of the four areas may be selected within the user interface to transition to a finish pin gallery and project finalization page for each area, which may include AR/VR imaging for a space. Such an area is described below with respect to FIG. 10. FIGS. 8 and 9 also show user interfaces for a corresponding construction project, with FIG. 8 showing areas 842A-G of a house 840, and FIG. 9 showing areas 954A-E of a building exterior 952. Just as above for FIG. 7, each of these areas may be selected to transition to an interface for specific finishes within the selected area with associated AR/VR imaging.

Figure 10:
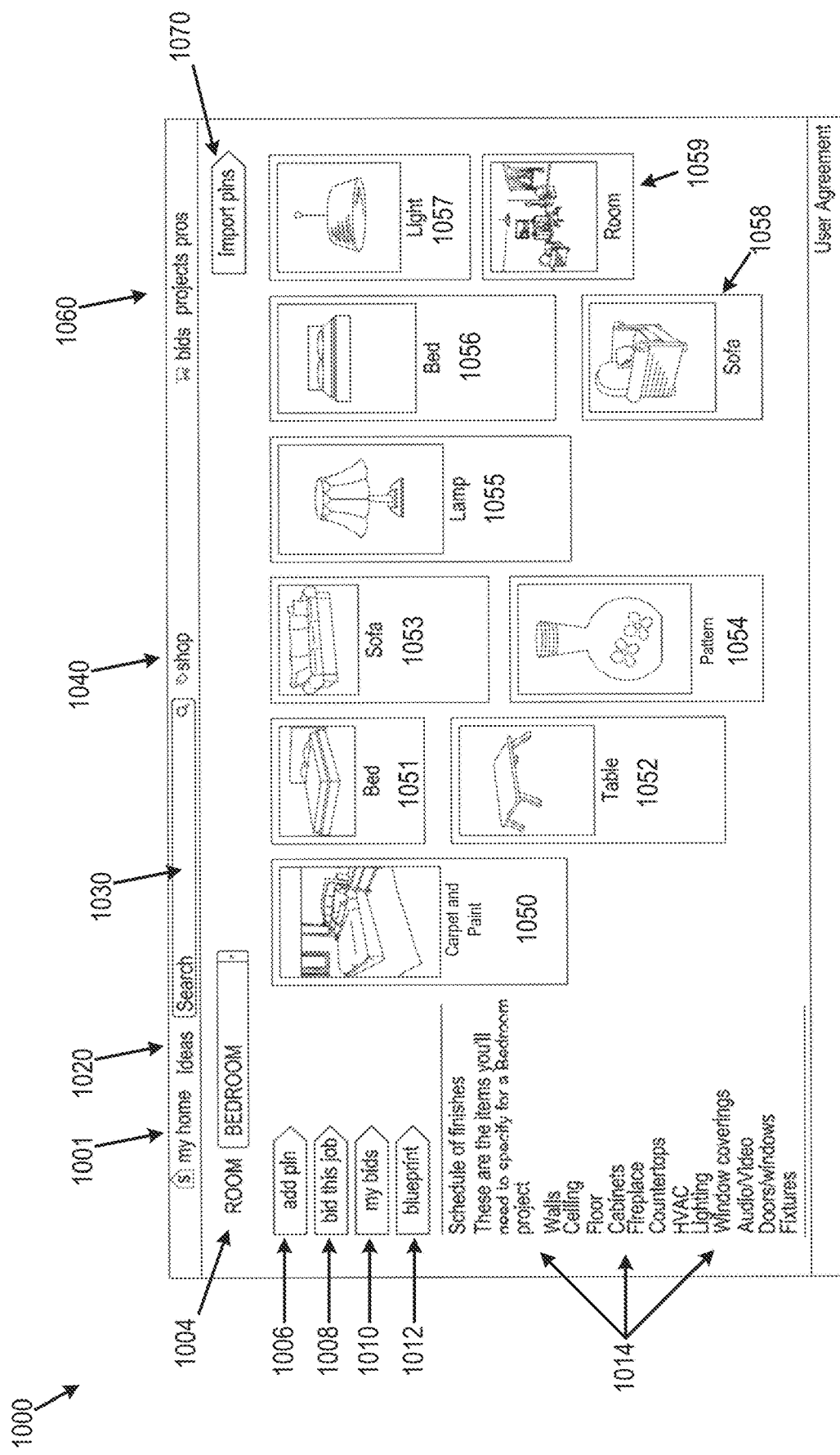
FIG. 10 illustrates aspects of a user interface of a computing device as part of client/contractor communication system operations in accordance with some embodiments.

FIG. 10 then shows a user interface 1000 for a specific area within a general user interface structure. For an AR/VR device, such an interface may be displayed within a tile or space of the displayed environment, allowing for selection of any user interface element. Selection of certain elements from such an interface within an AR/VR environment may update the environment around the user interface structure. For example, with AR glasses, a portion of the field of view of a user may include an unchanged viewing environment, a portion of the field of view of the user may be taken up by a space displaying user interface 1000, and a portion of the field of view may include augmented (e.g. artificial) images displayed over the top of the environment (e.g. changes to wall color, floor finishes, additional cabinetry or furniture, etc.) User interface elements 1001, 1020, 1030, 1040, and 1060 may be elements that are general across multiple different user interfaces of a system. An ideas user interface element 1020 may lead to a general gallery interface, and a search user interface element 1030 may enable text or image searching within a system and also across a WAN. A shop user interface element 1040 may access purchase areas for direct purchasing of product as part of a project within the system, and user interface elements 1060 may provide selection elements for other system aspects, such as professional interfaces for bidding on projects, selection between multiple projects associated with a user, listings of professional accounts linked with a current account associated with the user interface display, or other such interface elements. In any such interface, selection of a my home user interface element 1001 by any user will take the user to a particular building interface associated with a home for the account logged into the system and associated with presentation of the user interface. This will result in a corresponding property interface with one or more areas, such as those of FIGS. 7-9, being displayed as part of the user interface. Selecting one of the areas in the building interface, such as the bedroom 842A of the house 840, results in a user interface with finish pins for a particular area, such as that shown in the user interface 1000 of FIG. 10. For AR/VR interfaces, selection of certain elements may change the AR/VR environment or elements of the environment.

FIG. 10 then shows additional user interface elements of the user interface 1000 that are specific to the selected area, which in this case is a bedroom, as shown by an area indicator 1004. The selected area is associated with sets of finish pin data 1050-1059. A user interface 1070 enables importing of multiple finish pins from other sources. A user interface element 1006 enables input of a new finish pin data set. This finish pin data may be presented as ideas for a potential project, with the project not yet in a finalized state, or finalized selections for a construction project. If the finish pin data is not finalized, options for contacting a design professional or "friend" accounts for feedback may be presented. A user interface element 1014 may provide an initial list of finishes or finish templates expected for a particular area construction project, depending on the complexity of the area. In one embodiment, interface element 1014 is generated in associated with a system project taxonomy that associates areas with selected particular types or finish options. Element 1014 may then include selections to provide an additional interface with curated options for each finish type. For example, selection of "walls" may present an interface for wall finish textures, wall colors, trim, or other options. Depending on the number of finish types and the complexity of each type, multiple tiers of selection options may be included as part of the interface element 1014. Further, as part of interface element 1014 selections, a particular selection may be indicated as finalized, which may result in automatic propagation of information associated with the selection to interface areas of a project. For example, selection may result in data being added to a finish interface such as interface 1970 of FIG. 19, an automatic cost estimate to interface 1995, documentation or product purchase options being added to interface 1990, an initial task list added to task interface 1930 with an associated initial subproject indicator added to a project chart, and any other such data propagation. Similarly, information associated with the selected finish may be added to an AR/VR model of the project or project area. Such interfaces areas may then be directly accessible from selection of a finish displayed in a list of project finishes an visible in AR/VR imaging, as detailed below.

If the selection finish pin data for an area of a project is indicated as finalized by selecting a user interface element 1008 to initiate a bid, the system may initially review a set of automated checks for a particular room type. The system may then guide the user through additional missing finishes expected for the area type, with the user providing additional finishes or an indication that the finish is not needed. This information may be included in the project as part of a project bid request. Additional details related to system indications of missing finish elements and automated guidance are described below with respect to FIG. 13. A user interface element 1012 may additionally enable previously created blueprints or drawings to be included in ideation or bidding, or may provide an updated record of plans if a construction project is under way or completed. User interface elements 1010 may provide information on one or more bids that have been received once a project is finalized and sent for bidding.

Figure 11:
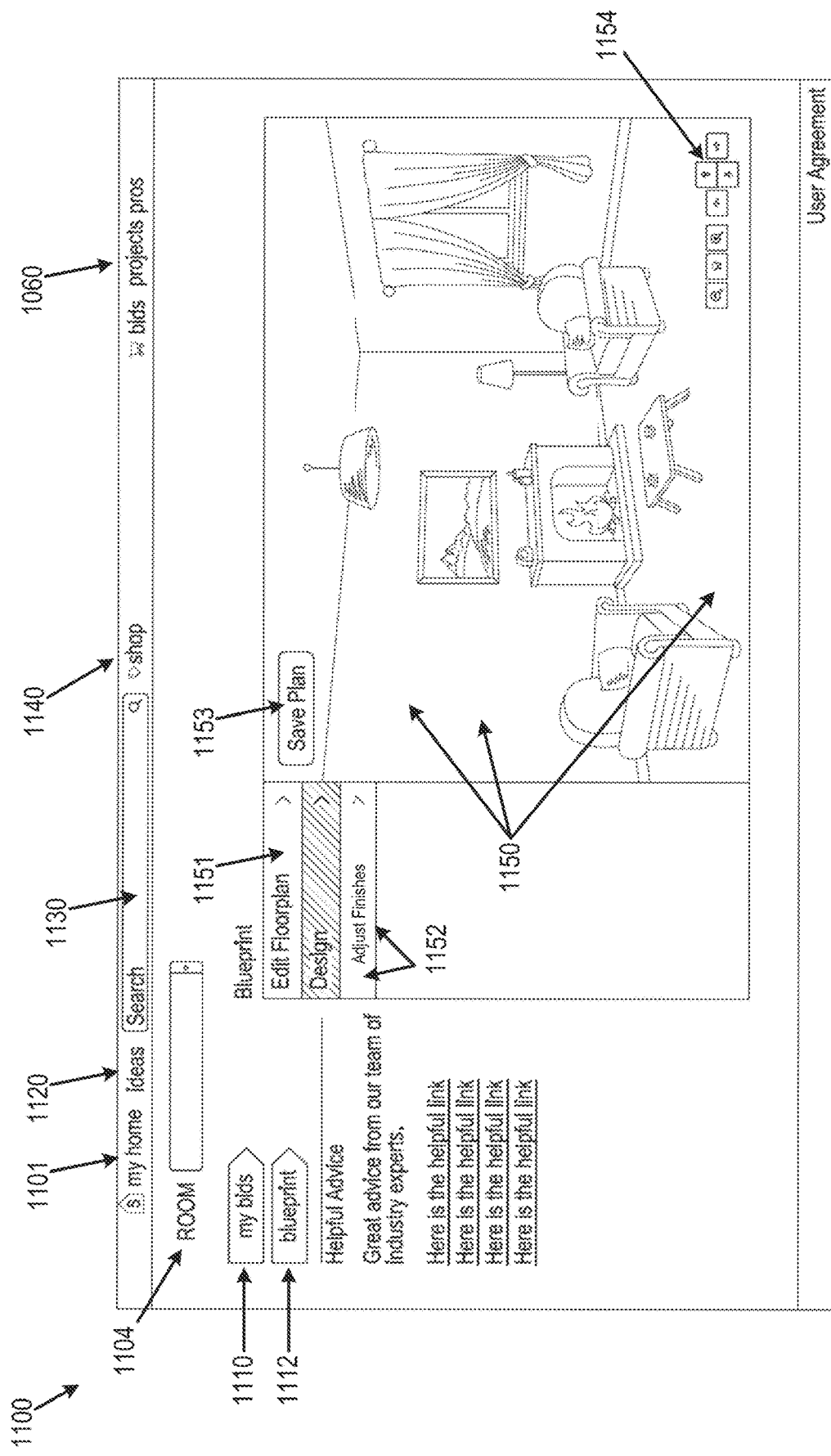
FIG. 11 illustrates aspects of a user interface of a computing device as part of client/contractor communication system operations in accordance with some embodiments.

In one embodiment illustrated by FIG. 11, the user interface element 1012 may correspond to a user interface element 1112 to access a user interface for displaying a 3D model of an area that is adjustable, and that may be associated with finish pin data. FIG. 11 shows a user interface 1100, with user interface elements 1101, 1110, 1112, 1120, 1130, 1140, and 1160 corresponding to the general user interface elements described above for corresponding user interface elements 1001, 1010, 1012, 1020, 1030, 1040, and 1060. An element 1104 shows the area selected and associated with the current user interface, with floorplan and design documents associated with the area available under interface tabs 1151 and 1152. A 3D model viewing area 1150 then shows a perspective of a rendered 3D model of the area selected in association with the element 1104. By selecting an edit floorplan interface tab 1151, the user may move and adjust finish elements within the 3D model shown in the viewing area 1150. Additionally, design and adjust finishes interface tabs 1152 may be selected to add, delete, or change particular finishes shown within the model. For example, wall color, lighting fixtures, flooring material, furniture, door and window placement and style, or any other such finish element may be adjusted and placed within the 3D model shown in the viewing area 1150 from within the system in accordance with the user interface 1100. As adjustments are made, an interface element 1153 may be selected to save changes to the 3D model, and elements of an interface 1154 may be used to adjust the perspective of the area of the 3D model shown in the viewing area 1150. For example, zoom, pan, tilt, and rotation of the perspective shown within the viewing area 1150 may be implemented using the interface 1154. While a particular room with particular finishes is shown in FIG. 11, it will be apparent that any other type of area associated with a construction project may be presented as part of a 3D model, including building exteriors and roofing, gardening and outdoor landscaping, and other such areas in addition to indoor room models.

Figure 12:
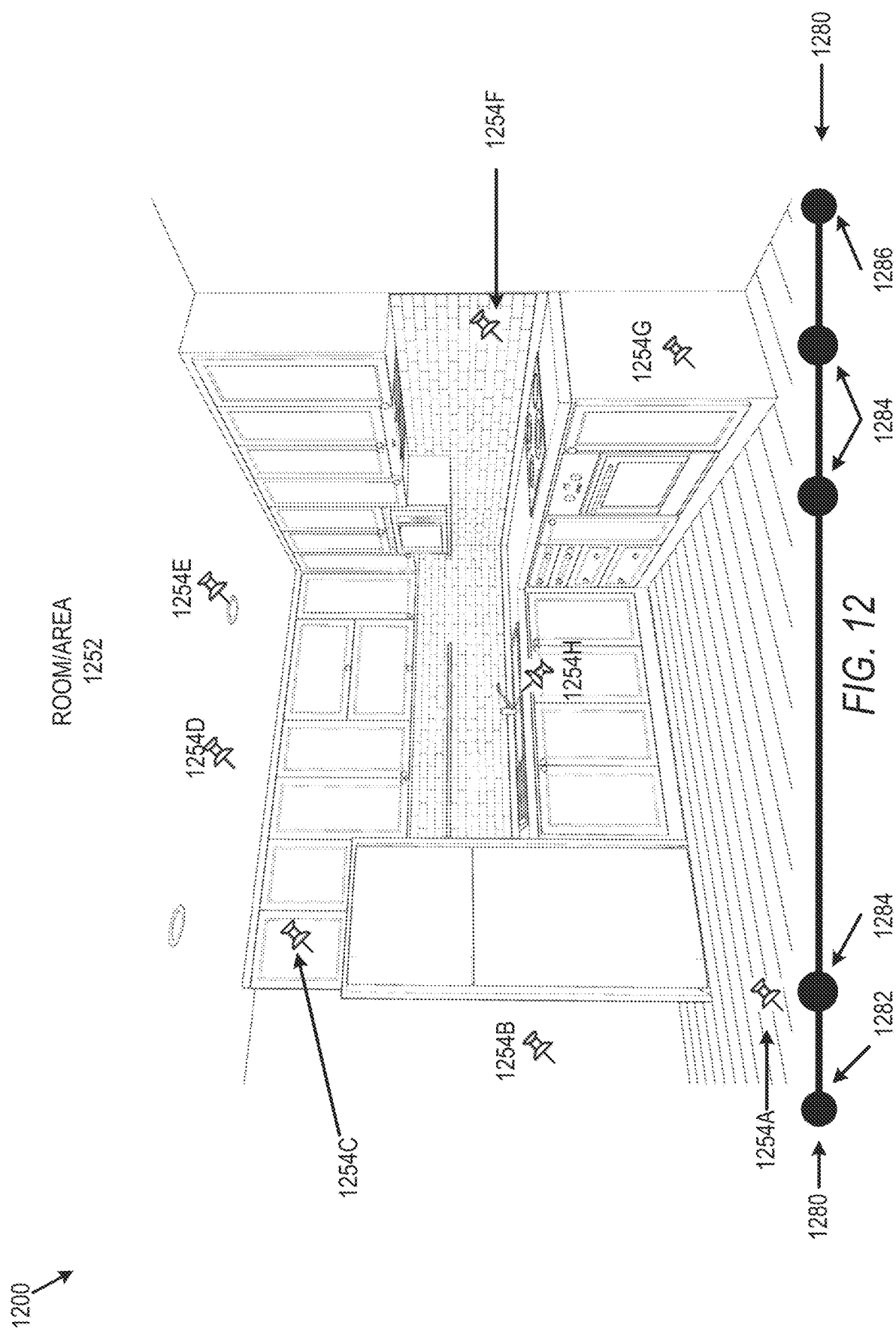
FIG. 12 illustrates aspects of a user interface of a computing device as part of client/contractor communication system operations in accordance with some embodiments.

As part of area modeling and project generation from ideation, finish pin data sets may be associated with models in an AR/VR image that is shown within a blueprint area of a user interface or which is shown to a user of AR/VR hardware. FIG. 12 illustrates a perspective of an image 1200 associated with a room/area 1252 with finish pin data associated with finishes of the 3D model. The room/area 1252 may be any area selectable in an interface such as those shown in FIGS. 7-9. FIG. 12 shows a perspective of an area that may, for example, be presented within the viewing area 1150. In some embodiments, image 1200 may represent the view of a user through AR glasses, with certain finish elements being modifications of what is actually present in the room. For example, lighting fixtures, floor patterns, cabinets, or other surfaces or objects may be modified as part of the AR view. Similarly, image 1200 may be a VR image from a VR model of a space. In some embodiments, images such as image 1200 may be generated by a first user with AR/VR hardware viewing the image from within a VR environment, and the image may be shared with other users through a virtual meeting. A first user may thus see image 1200 as part of an immersive AR/VR image, while another user may see image 1200 within a tile in a computer screen, and a third user may see image 1200 within a window/tile of AR glasses while simultaneously viewing other tiles as well as an immersive AR background. In some embodiments, two AR users may thus be viewing the same space with different AR modifications of the space while each sharing their view to a small window within the other user's AR view.

In some such embodiments, different aspects of the models within the represented area are associated with "finish pin data sets." For example, a finish pin data set 1254A is associated with flooring material, a finish pin data set 1254B with wall texturing and color, a finish pin data set 1254C with cabinetry, a finish pin data set 1254D with ceiling finish and color, a finish pin data set 1254E with lighting fixture(s), a finish pin data set 1254F with a tile backsplash, a finish pin data set 1254G with lower cabinetry, and a finish pin data set 1254H with faucet fixtures and/or sinks. As part of a project, every element of the project may be associated with such finish pin data, which may be represented as shown within a 3D model and presented in a user interface. In some embodiments, AR/VR environments include such pins as selectable AR/VR elements to enable menus to change aspects of the associated finish. The associated finish pin data not only represents a location and image of the finish within an AR/VR model, but may also be associated with additional data. This may include particular products, images or videos in an ideation page, receipts and warranties for purchased products, colors, paints, surface finish requirements of a project, material lists, or any other such information associated with the finish itself. In addition, other context information associated with the finish in the context of the project may be associated with a finish pin data set. For example, a finish pin data set may identify a subcontractor assigned to perform the work for the finish, scheduling data in the context of the entire project, including finishes or other subproject work required to be completed before work begins on a particular subproject associated with the finish and finish pin data set, other subprojects dependent on completion of work for a finish associated with the finish pin data set, or other such information. For example, if cabinetry installation is required before backsplash installation, finish pin data for the finish pin data set 1254F may indicate a dependency on subproject timing for the finish pin data sets 1254C and 1254G. Within system user interfaces, finish pin data sets in an area page such as that represented in the user interface 1000, finish pin data sets associated with a 3D model as illustrated in FIGS. 11 and 12, and any other reference to a particular finish pin may enable direct linking to the subproject indicator in a project chart (e.g., Gantt chart) associated with the particular finish. For example, in the embodiment above, selecting the finish pin data set 1254F may enable a direct link to information on the backsplash material as well as a highlighted display of the subproject timing in the context of a project chart, such as the chart of FIG. 20. In some embodiments, selection of a 3D model element associated with finish pin data may result in the interface providing a list of interface areas having data associated with the finish pin and 3D model element, and may allow direct navigation to any associated interface area with a focus or highlight on the relevant data for the finish pin. Similarly, other interface areas may allow direct navigation to the 3D model with a highlight on the 3D model interface element associated with the finish pin by similar user interface operation.

As described above, FIG. 12 can represent an image generated from a 3D model of a construction project at one point in the project flow. As described herein, various different points within a project can have different associated 3D models. In some embodiments, an AR/VR interface can include a project chart interface 1280 that includes a plurality of project positions 1282, 1284, 1286 associated with different 3D models. As a user views an AR/VR interface, selecting particular positions in project chart interface 1280 causes presentation of a different 3D model. For example, an initial 3D model associated with first project position 1282 can simply include the leveled ground where the project will occur. Multiple intermediate project positions 1284 can include 3D models of a partially constructed project. For example, one project position 1284 can be associated with a 3D model that includes finish pin data for floors and walls, but no cabinets, lights, or fixtures. Another 3D model associated with a project position 1284 can include floors, walls, lights, and cabinets, but no fixtures. A final project position 1286 can include all selected finish pin data, as well as indicators for unselected finishes. In some embodiments, selecting different project positions from project chart interface can provide a user with information about when in a project certain materials are needed or when within the project flow certain final decisions need to be made to avoid project delays. For projects involving pre-designed buildings or use of pre-designed modules of a building that can be connected together, automatically generated models for different project positions can provide a user with information about how different configurations of different pre-designed modules can impact the project flow and timing. For example, selecting two modules connected in an L shape can automatically result in a first project chart with a first set of associated 3D models for different positions in the first project chart, while adding a third module with a change to the external walls configured in a T shape can result in automatic updates with changes to the 3D models and available displays of 3D models at different points in a project chart interface based on information in the system automatically identifying the steps and instructions expected for building of the different configurations of pre-designed home elements. While project chart interface 1280 is illustrated as a timeline, in other embodiments a drop-down menu, a selectable interface within a chart, or other such interface elements can be used to enable selection of different 3D models as a project chart interface.

Figure 13:
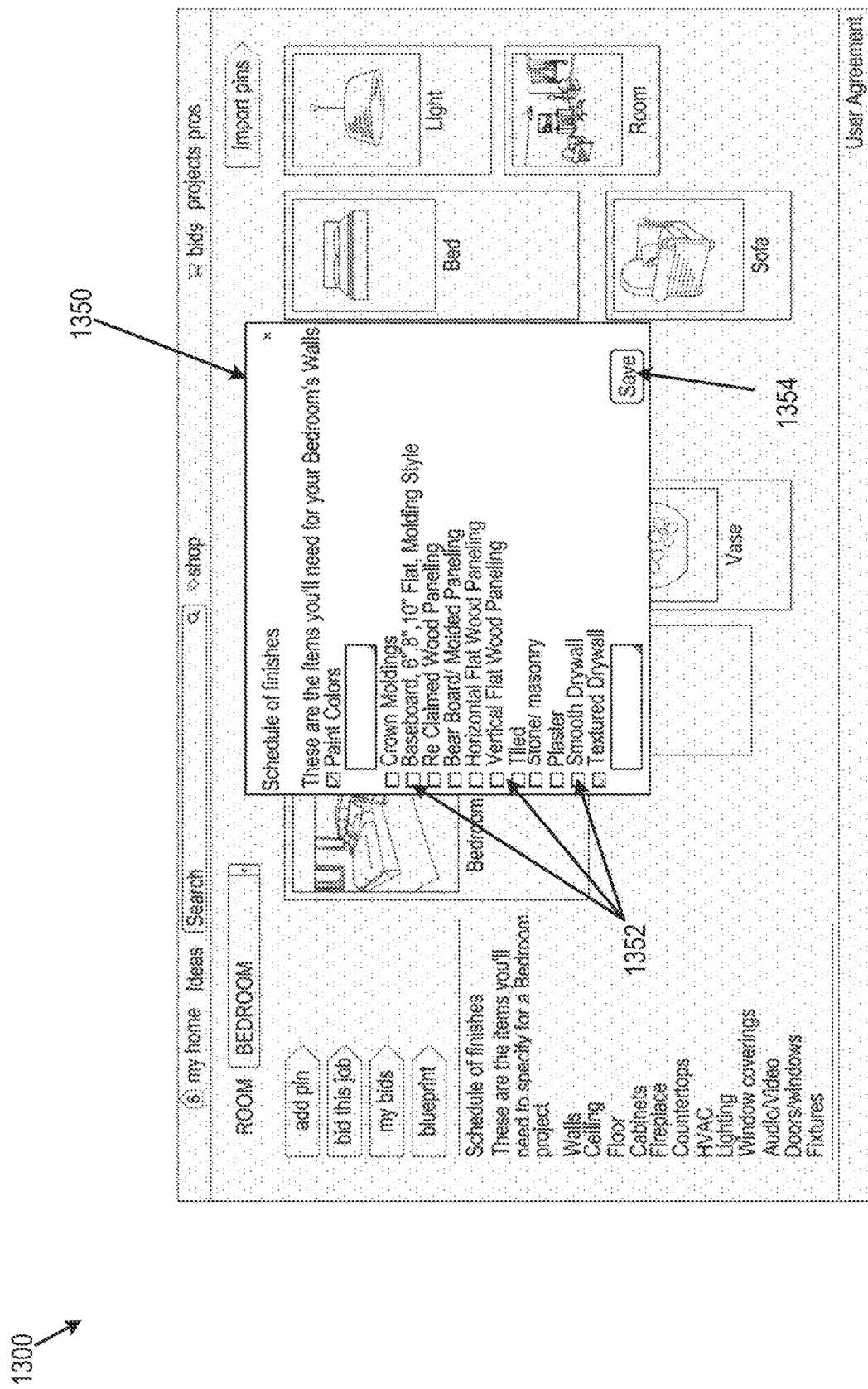
FIG. 13 illustrates aspects of a user interface of a computing device as part of client/contractor communication system operations in accordance with some embodiments.

FIG. 13 then illustrates additional aspects of system guidance for finalizing a project. As detailed above, a particular area may be associated with standard lists of finish options (e.g. interface element 1014). Selection of a finish type within such an interface element may result in presentation of a prompt area 1350 with options based on the finish taxonomy of a particular area type (e.g. as illustrated or selected by interface element 1004). Depending on the complexity of a particular finish type, multiple tiers of prompt areas 1350 may be used to complete a single selection type for a particular room. Additionally, further depending on the area (e.g. multiple walls), a single finish type may have multiple different selections for different physical portions of an area, with the differences reflected in selection options and/or presentation in a 3D AR/VR model of the area. Selection of specific particular finish at varying levels of specificity (e.g. blue paint vs. eggshell finish blue paint vs. Brand A paint with inventory #XXX) are possible with such an interface. Each selection is added to separate finish pin data sets of an area within a project.

When a user selects an element indicating a command to send a project for a bid, the existing finalized finish pin data sets may be compared against the standard schedule of finishes for the relevant areas. A project may have one or more areas, each being checked against the relevant list of finishes of a template for the area. The system may then identify missing finishes, and provide automated user interface displays and prompts to verify missing finish elements. A user may indicate that the finish details are left out on purpose, with an indication that finish selection will be part of the project bid, or the user may provide additional finish details. FIG. 13 shows a user interface 1300 having a prompt area 1350 including a schedule of finishes 1352 with a save element 1354. On selection of the user interface element 1008, for example, with missing finishes from the user interface element 1014, the prompt area 1350 is displayed with the user prompted to select finishes or provide an input indicating that the finish is not needed for the particular construction project. Such an indication may enable follow-up questions as part of a bid response from a professional user bidding on the construction project generated by this process. Responses to such prompts may generate additional finish pins and finish pin data for an area associated with the construction project. Additionally, if multiple areas are part of a particular construction project bid, this process may be repeated with prompts for each missing finish from a finish template of a particular area, until all missing finishes associated with all finish templates for all areas covered by the project have sufficient associated information.

Figure 14:
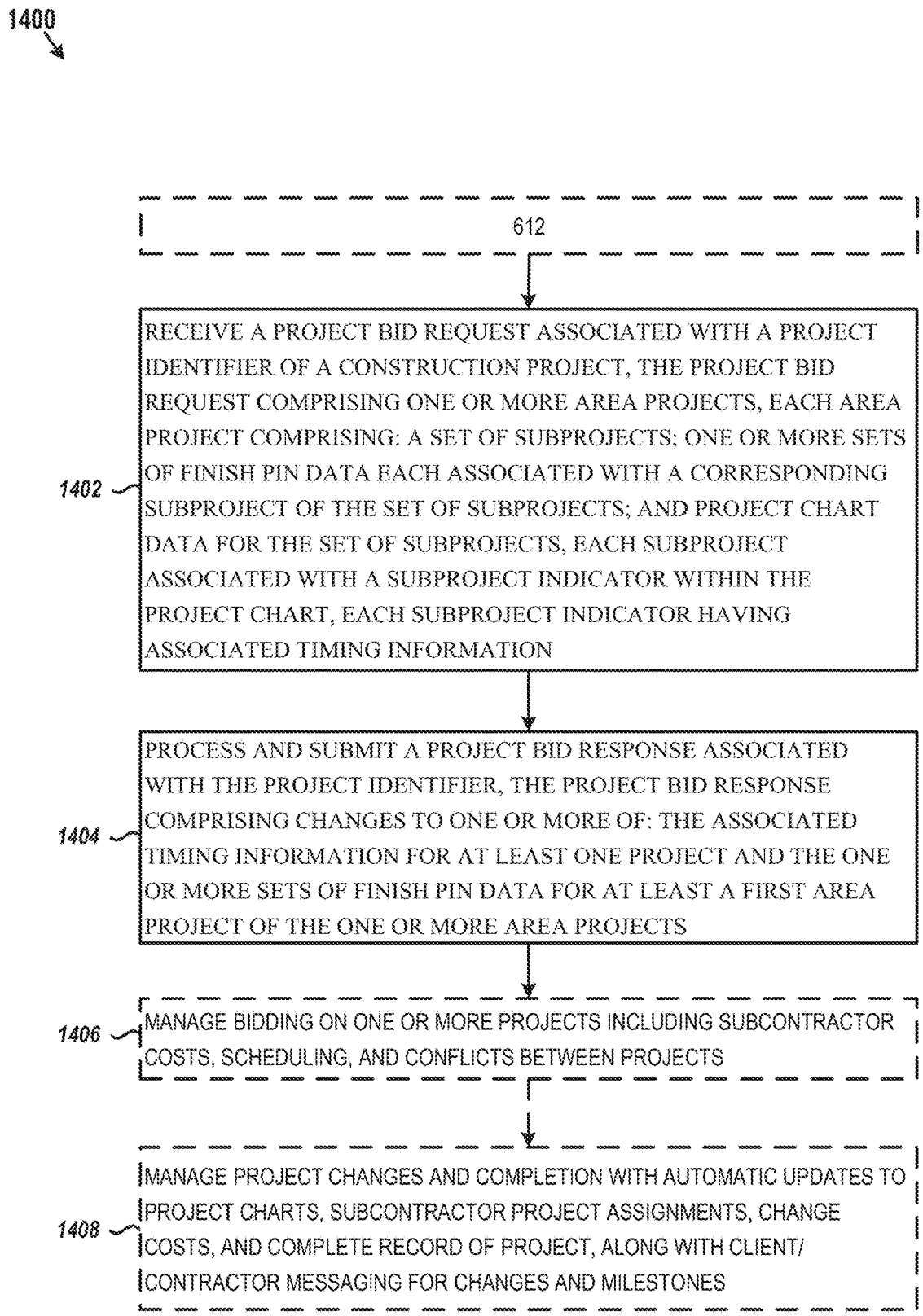
FIG. 14 illustrates a method performed by a computing device for client/contractor system operations in accordance with some embodiments.

FIG. 14 illustrates a method 1400 for a client/builder system in accordance with some embodiments described herein. In some embodiments, method 1400 is implemented by a device comprising a display, a memory, and one or more processors, which may also be involved with implementing method 600 or any other such method described above. Just as above for method 600, some embodiments, method 1400 is represented by instructions stored in a computer readable storage medium that, when executed by one or more processors of a device, cause the device to perform the operations of method 1400.

Method 1400 proceeds from any previous operations such as operation 612 that generate project bid requests to operation 1402, where a device receives a project bid request. Such a project bid request may be generated using systems described herein to insure that correct finishes are associated with a construction project, and based on ideation and management systems for an owner user account. As part of operation 1402, the bid request receipt may be associated with a number of builder accounts that have indicated their associated users are available and capable of performing similar projects. For example, a builder account may be associated with certain project types or area types (e.g. kitchen, pool, roof, etc.) identified as part of the project for the project bid request. As part of this operation, the project bid request comprises one or more area projects, each area project comprising: a set of subprojects; one or more sets of finish pin data each associated with a corresponding subproject of the set of subprojects; and project chart data for the set of subprojects, each subproject associated with a subproject indicator within a project chart, each subproject indicator having associated timing information. The bid request may additional include task lists with preferred team member characteristics identified by an owner user or by association of an area of the construction project with systems that match the area with team member skill preferences associated with such projects and areas. In operation 1404, after a builder user has generated a response, the system processes and submits (e.g. back to the owner user account) a project bid response associated with the project identifier, the project bid response comprising changes to one or more of the associated timing information for at least one subproject and the one or more sets of finish pin data for at least a first area project of the one or more area projects. Further operations such as 1406 involve the system managing bidding on one or more projects with the bidding involving subcontractor costs, scheduling, and project conflicts, as well as other aspects such as markups, penalties, permitting, design planning, and various contract details. Similarly, after a project agreement is reached between an owner and one or more builders, operation 1408 involves the system managing project changes and completion with automatic updates to task lists, project charts, team member assignments, change costs, messaging, milestones, interactions with regulators and permitting agencies, and other such aspects of a project.

Further such embodiments may operate with a system configured to analyze the set of subprojects to identify one or more subcontractor types associated with a first subproject of the set of subprojects; search a database of subcontractors based on the one or more subcontractor types to select a first subcontractor for the first subproject; automatically generate and communicate a subproject bid request to the first subcontractor using first finish pin data associated with the first subproject; and receive a subproject bid response where the project bid response is based at least in part on the subproject bid response. Other such embodiments may operate to select the first subcontractor from the database of subcontractors based at least on a match between a subcontractor project history and the first subproject, or select the first subcontractor from the database of subcontractors based on an image search match between image data of the first finish pin data and ideation image data associated with the first subcontractor in the database of subcontractors. In some embodiments, assistance with selection between multiple team members or subcontractors may be implemented with operations to select a second subcontractor from the database of subcontractors for the first subproject; automatically generate and communicate a second subproject bid request to the second subcontractor using the first finish pin data associated with the first subproject, and manage owner communications around differences or bid options presented by a single builder. Such differences may then result in operations to receive a second subproject bid response, wherein the second subproject bid response comprises timing adjustment settings different from associated timing adjustment settings for the subproject bid response; and process and submit a second project bid response, wherein the second project bid response is based on the second subproject bid response.

Other embodiments may include operations within a system and using a user interface of a system to select a second subcontractor for a second subproject; automatically generate and communicate a second subproject bid request to the second subcontractor using second finish pin data associated with the second subproject; and receive a second subproject bid response, where the project bid response is further based on the second subproject bid response from the second subcontractor.

In some embodiments, a system may automatically assist with scheduling by accessing scheduling data associated with one or more pending projects; and automatically generating changes to the associated timing information in the project bid request based on scheduling conflicts between the one or more pending projects and the project chart data. In other embodiments, a system may access scheduling data associated with one or more pending projects associated with one or more subcontractors, and generate the project bid response based on conflicts between the scheduling data and the project chart data.

Some systems may operate with communications functions to automatically generate and communicate a contract communication in response to a bid acceptance communication. Some such embodiments may also automatically generate and update initial scheduling data based on the project chart data in response to receipt of a contract acceptance communication. In some embodiments, the system is further configured to receive a scheduling update associated with a scheduling change associated with one or more pending projects separate from the construction project; process the scheduling update to determine a schedule impact on the construction project based on the project chart data and the scheduling change; and initiate an automated scheduling change communication for the construction project when the schedule impact is above a threshold value.

In some embodiments, a system operates to receive, from a subcontractor device, a subproject indicator change notification associated with a first subproject; and automatically generate an updated project chart based on the subproject indicator change notification, the updated project chart comprising updates to one or more related subprojects dependent on completion of the first subproject.

Some embodiments involve further operations to receive a completion notification associated with a first subproject; automatically generate an updated project chart based on the completion notification; and automatically generate one or more project communications associated with one or more related subprojects dependent on completion of the first subproject in response to the completion notification. Some embodiments involve operations to receive a first updated project bid request in response to the project bid response, the first updated project bid request accepting one or more of: a first subproject cost, a first subproject timing change, and a first subproject subcontractor selection. Similarly, some embodiments operate with an updated project bid request rejecting one or more of: a second subproject cost, a second subproject timing change, and a second subproject subcontractor selection. In other embodiments, any such metrics or criteria may be standardized between bids and automatically integrated with communications to enable standardized acceptance and rejection of portions of a bid with requests for updated bid details. This allows an owner to compare not just overall bids, but differences between bids and request to standardize or change portions of a bid before final decision making and project construction begin.

Computing and communication elements of a system thus enable storage of data for all parts of a project, including iterations of bidding requests and responses, with operations to store data for each iteration of data for a project. For example, a system may store each change for a project chart along with each associated bid response, bid acceptance confirmation, change request, change request quote, and change request approval; and automatically generate a final project report comprising the data for each iteration of the project chart and associated finish pin data in response to a completion notification for a final completion indicator of the project chart. Similar information may be stored for task lists, team member changes, scheduling changes, contract changes, or any other such data that passes through a client/builder platform.

Additionally, while various operations are described above, it will be apparent that operations may be performed in various orders, with intervening and repeated operations possible in various embodiments.

Figure 15:
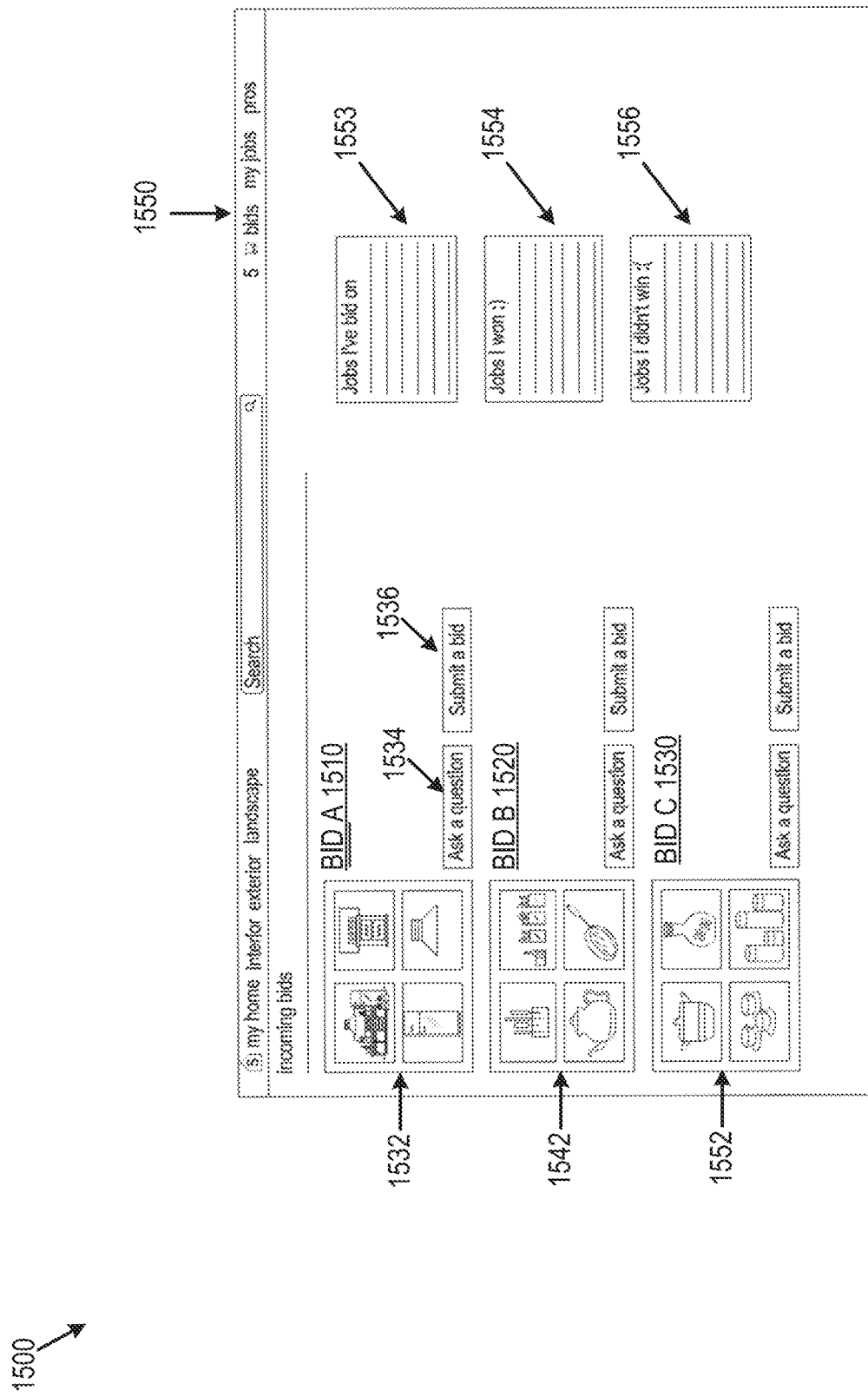
FIG. 15 illustrates aspects of a user interface of a computing device as part of client/contractor communication system operations in accordance with some embodiments.

FIG. 15 illustrates a user interface 1500 for a bid interface as part of a professional user system. In some embodiments, a general bids element 1550 which may be present in other user interfaces may be selected from the other interfaces to move to the user interface 1500. This interface then shows medium-detail listings for all available projects associated with the professional user account associated with display of the user interface 1500. In the example of FIG. 15, this includes separate draft bid response information for three separate projects, shown as bid A 1510, bid B 1520, and bid C 1530. Additional draft bid data may be accessed by scrolling. An interface element 1532 may provide a link to detailed information on a particular project associated with bid A 1510. Interface elements 1542 and 1552 may provide similar links to projects associated with bid B 1520 and bid C 1530. Such links may provide access to user interfaces such as the user interface 1000, associated 3D models, associated finish pin data, associated project charts, or any other such information. Upon reviewing this information, the professional user may then use an interface area 1534 to ask a question of the owner user associated with bid A 1510, or submit a bid via an interface element 1536. In addition, the user interface 1500 includes display areas 1553-1556 with summary information for outstanding bids (the area 1553), won bids (the area 1554), and lost bids (the area 1556). Lists within each of these areas may provide links to any associated additional detail available to the user of the user interface 1500. Once a draft bid is submitted, it may move to the area 1552. An owner may then communicate with the professional to ask for modifications or updates. When the owner makes a final decision and communicates a final bid response with a decision, the project is moved from the area 1552 to either the area 1554 if the bid is won, or the area 1556 if the bid is lost. When the user selects the interface element 1536 to submit a bid, standardized formatting may be applied to any information included in the bid response. Additionally, procedures for automated selection of personnel or subcontractors, schedule management checks against other projects from won bids, or other such information may be automatically managed by the system as part of generation of a bid response to be submitted to the corresponding owner user of a particular project associated with a bid request.

Figure 16:
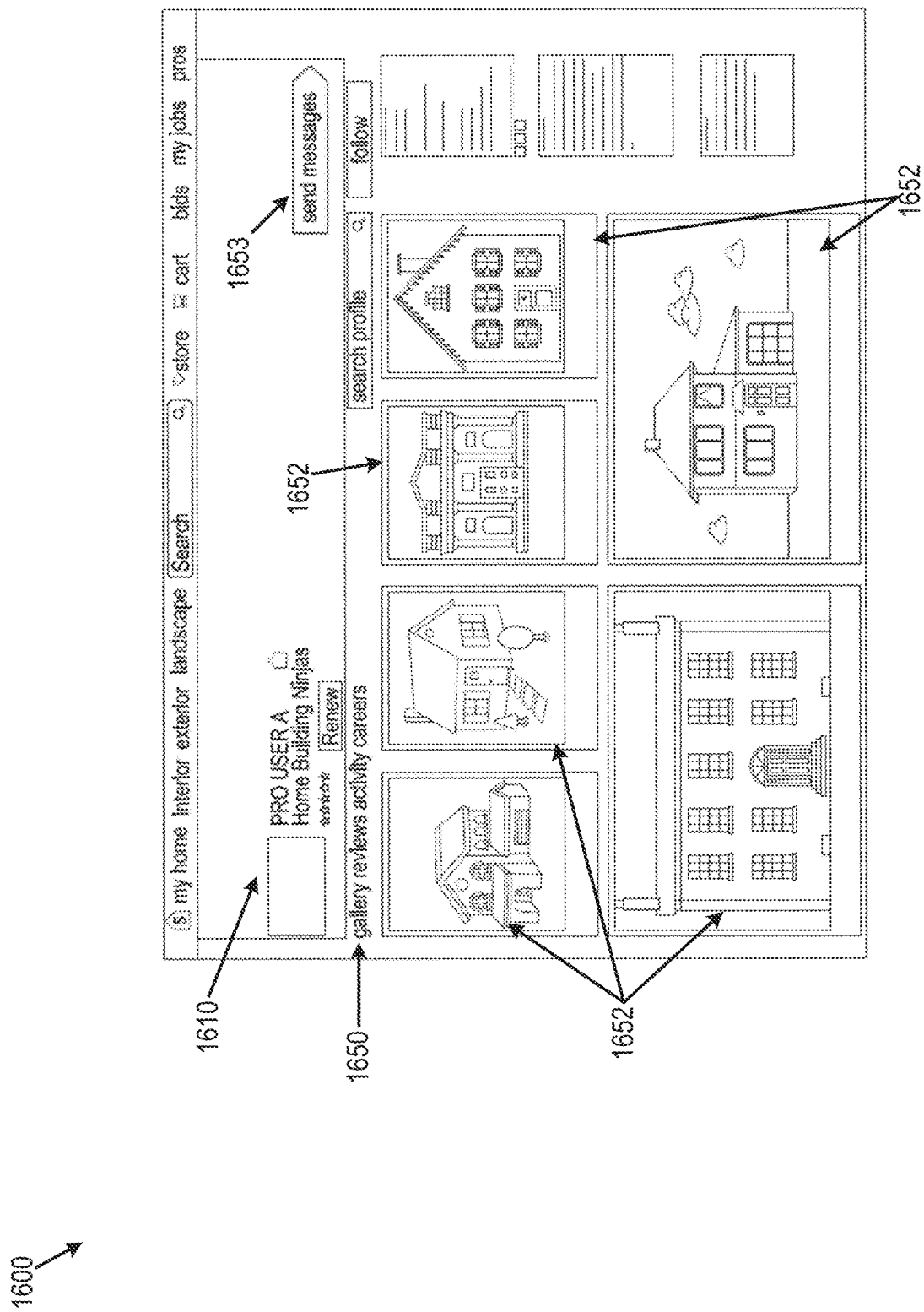
FIG. 16 illustrates aspects of a user interface of a computing device as part of client/contractor communication system operations in accordance with some embodiments.

FIG. 16 illustrates a user interface 1600 that may, for example, be associated with the gallery 524 of FIG. 5. The user interface 1600 includes an identifier 1610 for a professional user, as well as interface elements 1650 for selecting gallery, review (e.g., social network system), activity (e.g., shared projects and other current activities), and careers (e.g., hiring or subcontractors wanted) interfaces associated with the professional user. The user interface 1600 includes gallery data 1652, which may comprise a portfolio of work completed or in process by the professional user, including VR files for example projects, or any other such information shared by the professional user. A user interface element 1653 may enable various communications, including messages to the professional user by other users.

Figure 17:
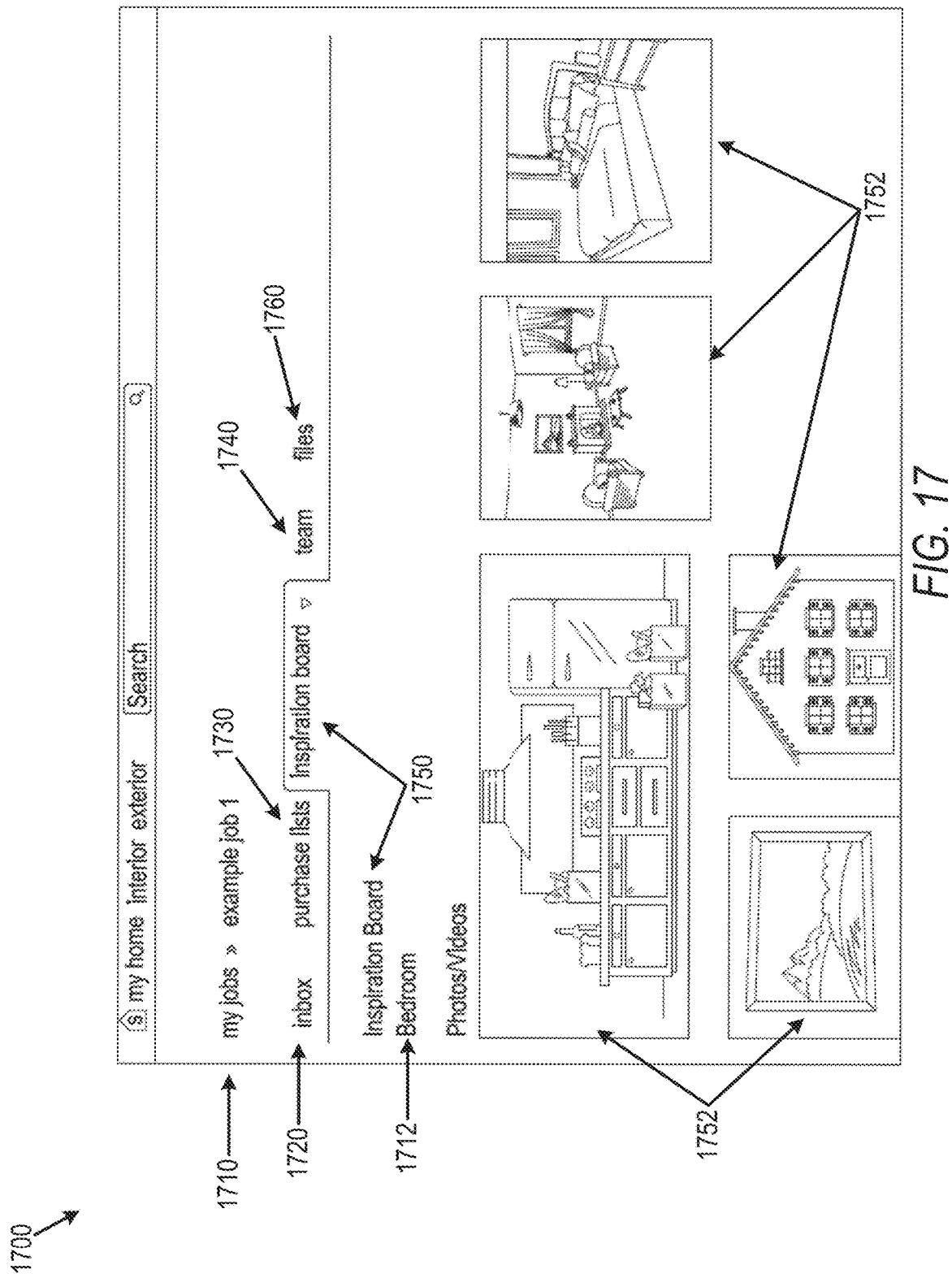
FIG. 17 illustrates aspects of a user interface of a computing device as part of client/contractor communication system operations in accordance with some embodiments.

FIG. 17 then illustrates a user interface 1700 for a particular project 1710. The user interface 1700 includes interface elements including an inbox 1720 for communications associated with the project, purchase lists 1730 for materials associated with the project, a team 1740 for other professionals associated with the project, and files 1760 for any documents associated with the project, which may include drawings or finish pin data for any finish or item in the project. An inspiration board 1750 may include finish pin data 1752 for items not yet finalized within the project, particularly in the context of design work between a professional and an owner for a particular space identified by an area indicator 1712. As part of such a user interface 1700, an owner and a professional may upload finish pin data (e.g., images) for finishes. Such data may be images of a project in progress, or finish pin data with images that are not finalized as part of a project for the purpose of assisting with ideation and selection of final finishes. This information may be updated and visible to both the owner and the professional within user interfaces associated with a particular area of a construction project.

Figure 18:
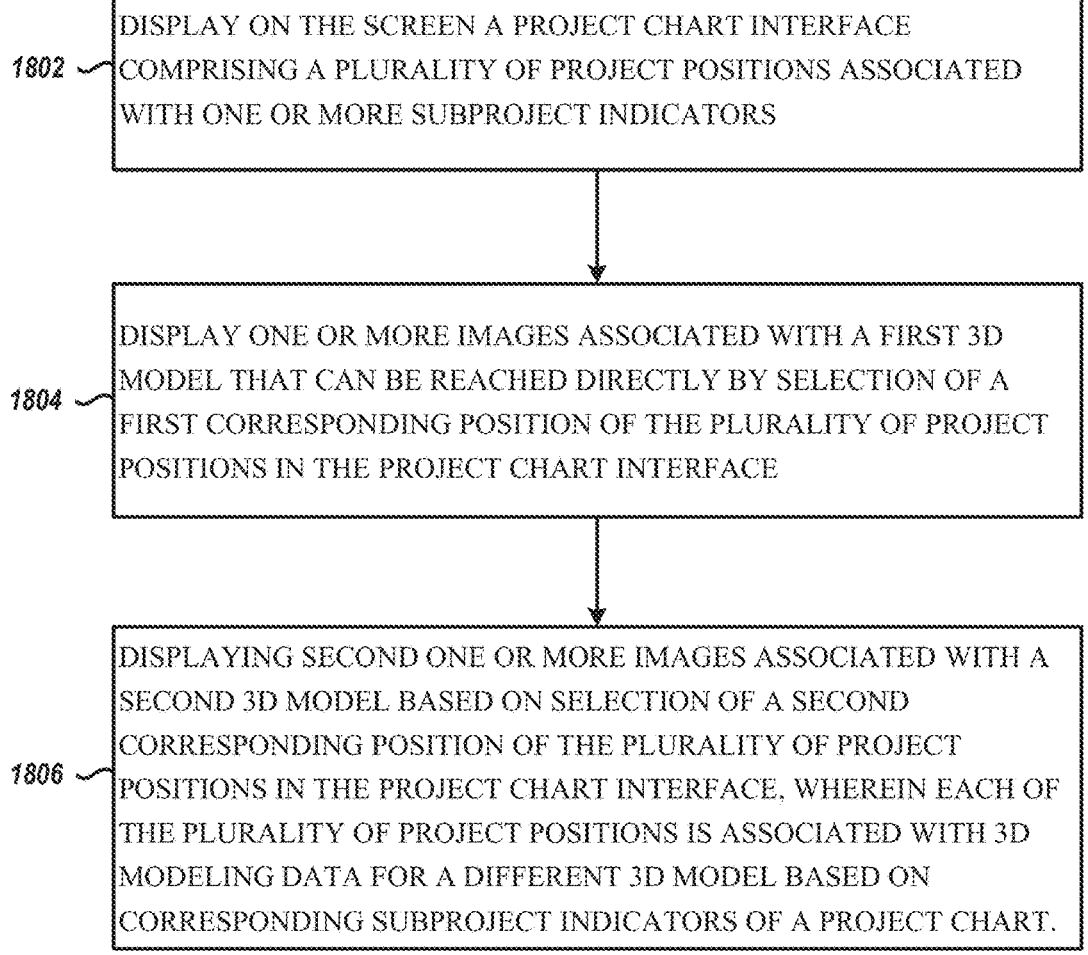
FIG. 18 illustrates a method performed by a computing device for client/contractor system operations in accordance with some embodiments.

FIG. 18 illustrates a method 1800 for a client/builder user interface in accordance with some embodiments described herein. In some embodiments, method 1400 is implemented by a device comprising a display, a memory, and one or more processors, which may also be involved with implementing methods 600, 1400, or any other such method described above. In some embodiments, method 1800 is represented by instructions stored in a computer readable storage medium that, when executed by one or more processors of a device, cause the device to perform the operations of method 1800. Method 1800 involves operation 1802 with a computing device displaying on a display screen an interface with a project chart interface comprising a plurality of project positions associated with one or more subproject indicators. As described above, such a project chart interface can be a timeline or a listing of project milestones, with certain milestones or subproject indicators having an interface link to a 3D model associated with an AR/VR presentation of details of a design associated with that point in the project. Operation 1804 then involves display of one or more images associated with a first 3D model that can be reached via the project chart interface as described above. For example, when a project is selected, a portion of an interface can include a project chart interface with positions allowing selection of a beginning and end of the project, as well as intermediate points in the project where construction is partially completed. Models for the beginning of the project can show the land, and models for the end can show a building with all selected finishes. Intermediate models can show expected positions and views of partially constructed aspects of a design at certain points in the progress of a project chart. When a position from the project chart interface of operation 1802 is selected, the first 3D model associated with the selected position is displayed in operation 1804. Then in operation 1806, a second different model of the same project at a different point in the project can be presented after selection of a second position for a different subproject indicator from the project chart interface.

In certain embodiments, the project chart interface comprises a listing a plurality of finish pins for a first construction project, each finish pin of the plurality of finish pins comprising information associated with one or more subprojects of the first construction project, and a 3D model for the project at the point in the project flow where the subproject occurs. In addition to the interface for accessing 3D models, the interface can also include elements to access project data that can be used to update a project chart based on changes to one or more finish pins, with the changes reflected in subsequent display of the chart within the user interface and with associated updates to 3D models. Additionally, as described above, an AR or VR system may have multiple different displays of the same space for different stages of the project. In some embodiments, selection of particular element within a project chart enables launch and display of the AR or VR imaging associated with that stage of the project. For certain finish pins, selection of the finish pin may be associated with a particular stage of construction, and may thus be associated with particular AR/VR imaging for that stage of the construction, with automatic updates to the 3D models as changes are made to finish selections or other visible elements of a project.

In one embodiment, for example, an interface includes a set of finish pins each associated with finish pin data, such as interface 1000 of FIG. 10. Selection of an individual finish pin may either take a user directly to the associated task in an interface such as display 1936 of FIG. 19A, or to a highlighted subproject indicator of a project chart such as the one in FIG. 20. In some embodiments, selection of an individual finish pin provides a list of viewing area interfaces that include data associated with the finish pin. If only a single viewing area other than the finish pin display is associated with the finish pin, selection of the finish pin may take the user interface view directly to the other interface viewing area. If multiple interfaces viewing areas (e.g. interfaces with viewing areas such as viewing areas 1920, 1940, 1950, 1960, 1970, 1980, 1990, 1930 of FIG. 19), list may be displayed. Selection of a particular viewing area within the list may then change the displayed interface to show the selected viewing area, with a focus or highlight on the information associated with the selected finish pin. As data is added to a particular finish pin during project creation, additional interface viewing areas are added to the list (e.g. as team members are assigned, a team member viewing area showing the assignment may be added to the list).

Figure 19A:
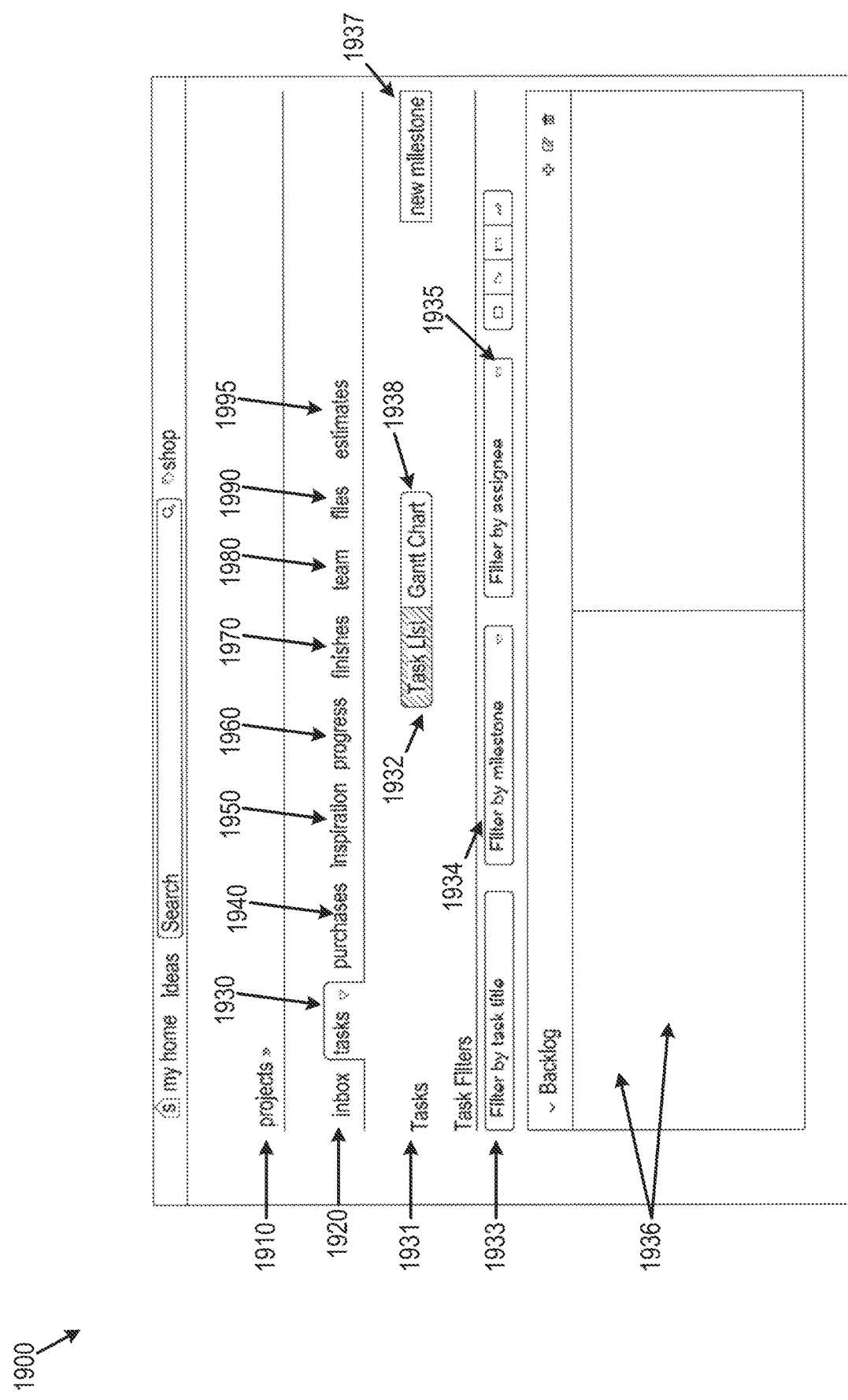
FIG. 19A illustrates aspects of a user interface of a computing device as part of client/contractor communication system operations in accordance with some embodiments.
Figure 19B:
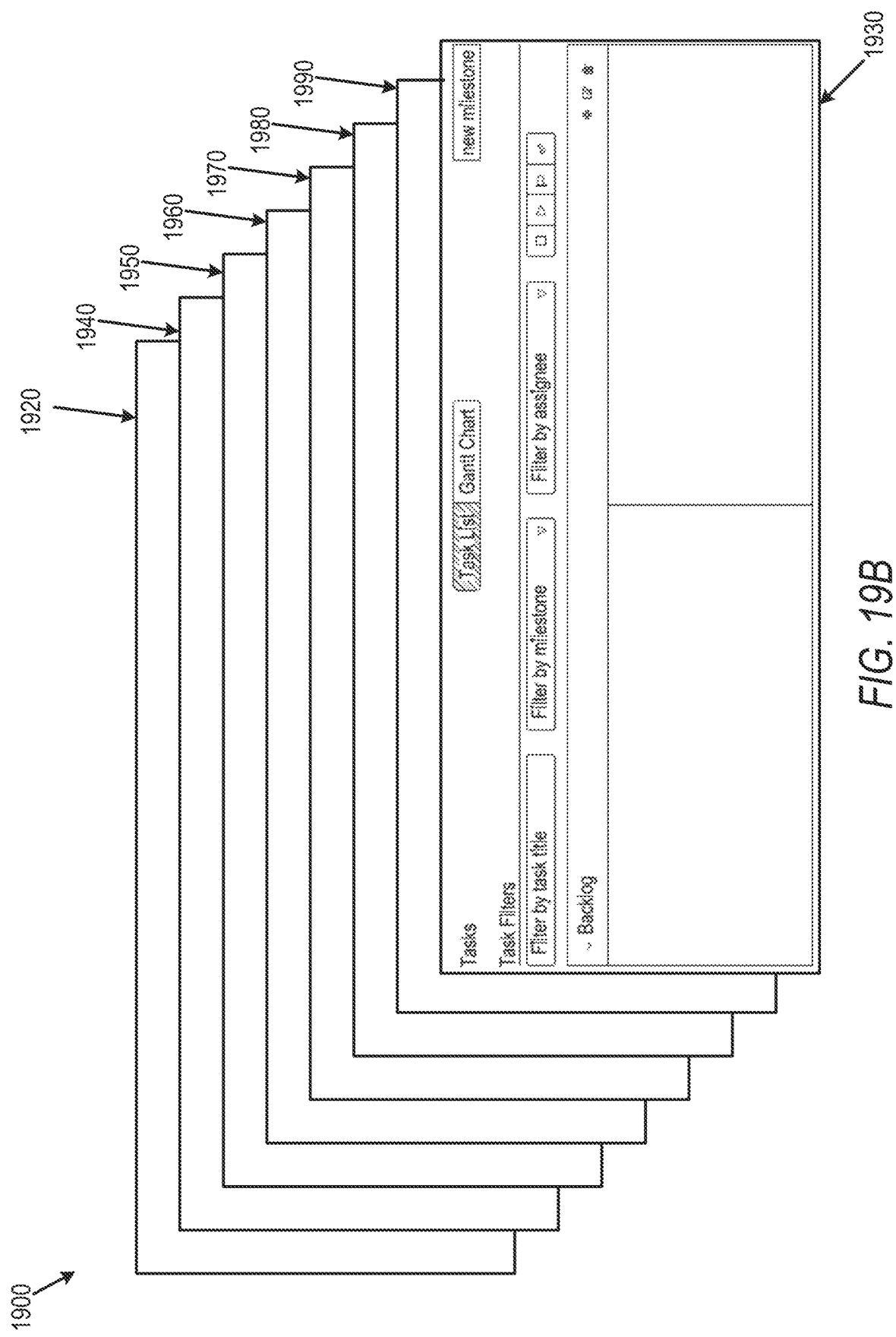
FIG. 19B illustrates aspects of a user interface of a computing device as part of client/contractor communication system operations in accordance with some embodiments.

FIGS. 19A and 19B illustrate a user interface 1900 for management and communication of a project where the project has been finalized, a bid submitted by a professional user, and the bid accepted by an owner user. The user interface 1900 includes an interface 1910 for selection between different projects for a particular user. The user interface 1900 includes interface and viewing areas for a variety of interactive user interface areas for a particular project. As shown in FIG. 19B, the user interface 1900 enables shifting between different viewing areas 1920, 1940, 1950, 1960, 1970, 1980, 1990, 1930, or any other viewing areas for a particular embodiment. In various embodiments, such interface windows may be presented in any display, including displays in an AR or VR environment, in order to integrate interface information from any interface described herein with AR or VR elements in other portions of a display, and to enable direct interaction and linking and change selection between the interface elements and the AR or VR elements.

The user interface 1900 as shown includes an inbox viewing area 1920 for communications, a purchases viewing area 1940 for product purchases associated with the project, an inspiration viewing area 1950 for ideation and unfinalized finish pin data associated with the project, a finishes viewing area 1970 for finalized finish pin data, a team viewing area 1980 for professionals working on the project, a files viewing area 1990 for any miscellaneous documents or drawings associated with the project as well as any contract documentation, and an estimates viewing area 1995 for cost estimates provided as part of the project, and updates based on changes or selections made after the project has begun with a bid by the professional accepted by the owner. FIG. 19A particularly displays a tasks viewing area 1930, with an indicator 1931 showing the selected tasks viewing area 1930 display, and elements of the tasks viewing area 1930 user interface display. These include a display area 1936 for project tasks, as well as filters 1933, 1934, and 1935 for filtering tasks within a project. Within the tasks viewing area 1930 user interface display, milestones may be selected using an interface element 1937 to select automatic messaging for certain tasks and schedules. This may include automated messaging when a particular subproject is completed or delayed by a threshold amount. The user interface under tasks viewing area includes an area for alternating between display of tasks and a chart of subtask timing shown via interface areas 1932 and 1938. The user interface 1900 additionally includes the option of displaying a project chart 1938 area as part of the user interface 1900. Additional details of such a chart are discussed with respect to FIG. 20. Milestones and completion details associated with tasks and a project chart may additionally be displayed in a progress viewing area 1960, which may further include information on differences between scheduled progress and actual progress, or any other such information. Such milestones and subproject timing indicators may be associated with particular AR/VR imaging showing intermediate imaging of a project, enabling automatic selection of such imaging from among other associated AR/VR imaging of the area.

In some embodiments as described above, when pin finish data is added to a project or imported into a project (e.g. via new project creation with an interface such as new element 760 or adding pins to a room associated with a project such as interface 1000 when assigned to a specific construction project), a task associated with the pin finish data is automatically created and placed within display area 1936 as associated with tasks viewable by selecting interface area 1932. Similarly, corresponding subproject indicators showing timing and other context information within the context of a larger project chart (and any other context) may be created for display as part of a chart in another viewing area associated with user interface area 1938. Selecting a task list element in display area 1936 or a subproject indicator (e.g. a bar within a project chart) allows direct connection to another user interface such as user interface 1000 showing the pin finish data, or another such interface with any detail associated with pin finish data for the task/subproject (e.g. documentation, drawings, images, comments, team assignments, etc.).

Figure 20:
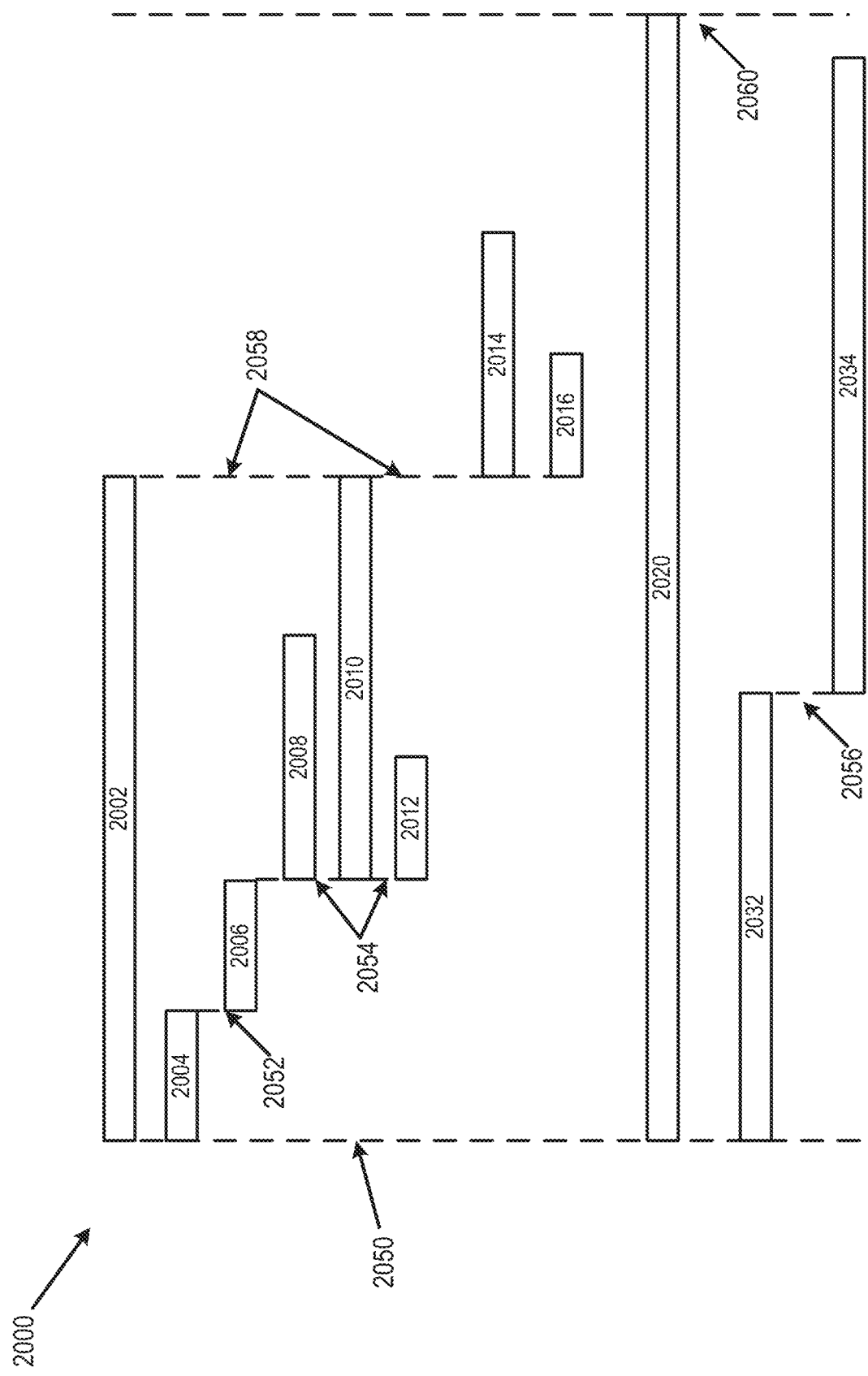
FIG. 20 illustrates aspects of a user interface of a computing device as part of client/contractor communication system operations in accordance with some embodiments.

FIG. 20 then illustrates an example project chart 2000, which may include subprojects shown by subproject indicators 2002-2034 (e.g., the bars), and dependencies 2050-2060 between subprojects, including a project start dependency 2050 and a project end dependency 2060. Such information may be generated automatically as part of project generation by an owner user as detailed above, and included with initial bid requests to professional users. Bid responses may thus include adjustments to timing of subprojects, and details of expected project completion based on detailed subproject timing estimates shown by the subproject indicators 2002-2034. In addition to the subproject indicators 2002-2034 shown, milestones may be entered at any point by owners or professionals, with particular messaging, payment, delay penalties, or other such system operations associated. Such milestones may additionally be associated with particular intermediate AR/VR imaging of a project. In some embodiments, systems for accepting images of the completed work and automatically generating comparison messaging with intermediate AR/VR imaging are automatically created and circulated as part of such milestones. Once a project is bid and the bid accepted, updates to the project based on various delays may be entered and propagated through the system, including into the project charts. Further still, embodiments described herein particularly enable direct navigation from particular projects, finish pin data elements, and subproject indicators of a project chart based on selection of those elements within one viewing area causing a user interface update to the related specific area of another viewing area of the user interface. Thus, selection of a finalized image of finish pin data in one viewing area may link directly to a particular subproject indicator of a project chart, and corresponding selection of the subproject indicator in the project chart may link to the finish pin data associated with the subproject, rather than the system requiring navigation through lists of subprojects, tasks, and finishes to match the project schedule to the finish pin data. Finish pin data for a subproject may include any data such as purchase requests, delivery information, personnel assigned to complete the work, or any other such information, and so subproject indicators showing delays or expected project timing and key details such as delivery dates and professional scheduling may be directly accessed via selection of finish pin and subproject indicator elements of a user interface.

In some embodiments, a construction project and the project chart and/or task list for the project are associated with a plurality of spaces comprising the first space, each space of the plurality of spaces associated with a corresponding project data list template of the project taxonomy, each project data list template comprising an associated plurality of finish elements. In some embodiments, the project chart and/or task list is further generated based on associations between the task and scheduling data for a plurality of team members assigned to the task based on scheduling information from associated professional accounts for each of the plurality of team members. The project chart and task list may also be based on material shipping information from a purchasing system, wherein the material shipping information is associated with materials from the finish pin data.

A project chart such as project chart 2000 may be presented on a display of a computing device as part of an interface area, and as described above, may be selectable from associations with finish pin data to present the project chart with highlights or focus on a subproject indicator associated with a particular finish pin. Similarly, selection of a subproject indicator in project chart 2000 allows navigation to relevant information in other interface views. In embodiment, a chart may be displayed in a tile of an AR/VR view, and may allow navigation to specific portions of an environment. For example, a bathroom subtask may enable automatic VR navigation to focus on the bathroom from any other VR view that includes the chart display in a window tile. A chart displayed in an interface area of an AR view may highlight an area in a field of view associated with the project. For example, a user standing in an empty field viewing AR imaging for a project in that field may select a subproject indicator for a project associated with trees, and have the location or AR imaging for the trees highlighted. In another example, if subproject indicator 2034 is associate with installation of lighting, selection of subproject indicator 2034, in some embodiments, results in display of a list of other interface areas associated with finish pin data for the lighting. This may include multiple finish pin data sets for different lighting fixtures, with interface area options in the list showing images of the lighting fixtures, team members assigned to installation, purchase and warranty details and documentation, or other such information. In some such embodiments, the representation of finish pin data may be associated with different levels of detail. For example, subproject indicator 2034 may be associated with different lighting fixtures, but additional more specific subproject indicators may be generated for each specific lighting fixture, with associated specific pin finish data for each fixture (e.g. a unique bar code for each purchased light), and selection of pin finish data at one level of specificity is matched to associated interface views at the same level of specificity, with options to select more specific data. This may, in some embodiments, include groupings by area, finish type (e.g. lighting, paint, cabinetry), assigned team members, or any other such grouping of data, with connections between pin finish data to various interface areas and UI displays created by the system automatically or selected by a user to create any association for various finish pin data sets.

While the methods described above present certain functions and operations in particular groupings, it will be apparent that different systems may include or exclude different functions in accordance with the particular embodiment. It will be appreciated that alternative embodiments may operate with certain groupings of system functions and that not every system will include every described function.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 21:
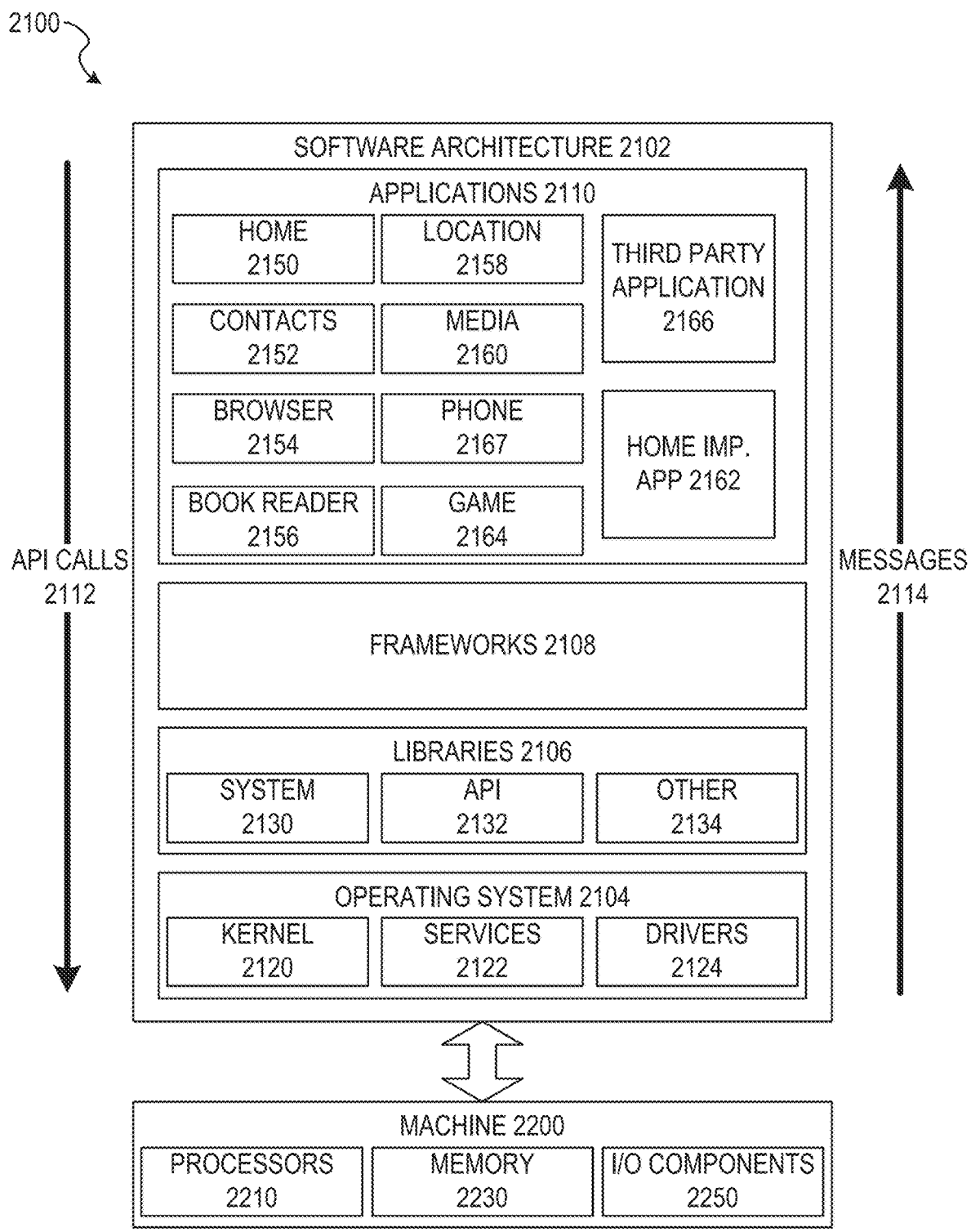
FIG. 21 is a block diagram illustrating an example of a software architecture that may be installed on a machine and used for a client/contractor communication system, according to some example embodiments.

FIG. 21 is a block diagram 2100 illustrating an architecture of software 2102, which can be installed on any one or more of the devices described above. FIG. 21 is merely a non-limiting example of a software architecture, and it will be appreciated that many other architectures can be implemented to facilitate the functionality described herein. In various embodiments, the software 2102 is implemented by hardware such as a machine 2200 of FIG. 22 that includes processors 2210, memory 2230, and I/O components 2250. In this example architecture, the software 2102 can be conceptualized as a stack of layers where each layer may provide a particular functionality. For example, the software 2102 includes layers such as an operating system 2104, libraries 2106, frameworks 2108, and applications 2110. Operationally, the applications 2110 invoke application programming interface (API) calls 2112 through the software stack and receive messages 2114 in response to the API calls 2112, consistent with some embodiments.

Figure 22:
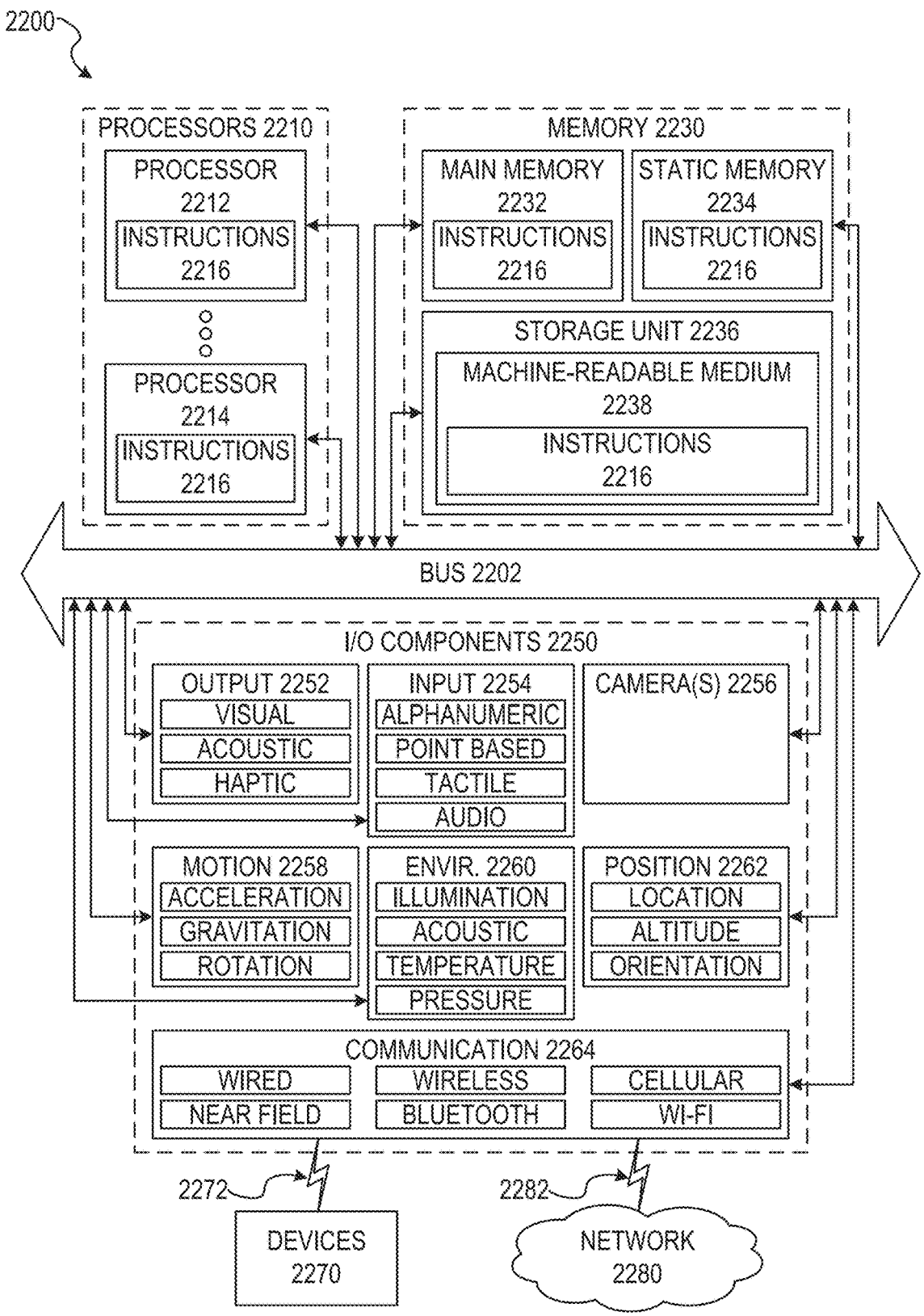
FIG. 22 illustrates a diagrammatic representation of a machine in the form of a computer system within which a set of instructions may be executed for causing the machine to perform any one or more of the methodologies discussed herein, according to some example embodiments.

In various embodiments, different servers or functionality described above may be implemented using the software 2102 and the machine 2200 of FIGS. 21-22. In various other systems, other software and hardware may be used. Such software and hardware structures together may implement any aspect of the user interfaces and communication systems for client users and professional/builder users described above, including systems to automatically update project (e.g., Gantt) charts associated with a project, and to implement user interfaces that allow direct connections from finish pin data to subproject indicators within a project chart, and to any communications, updates, receipts, payments, subcontractor confirmations, or other such data associated with particular finish pin data or subproject indicators.

In some particular embodiments, AR/VR hardware may use software 2102 and machine 2200 to implement user interfaces as described above. For example, in a VR implementation, one or more processors may access a storage medium containing VR files describing a computer rendering of an environment associated with a home improvement project. The processors may generate images to be output on a display (e.g. in a VR glasses display or a device screen) showing the environment along with various finishes and or finish pin data. The display may show the rendering of the environment as well as windowed or tiled areas including interfaces with additional information or controls such as those detailed above. An AR implementation may similarly use one or more processors to access a storage medium containing AR files. The AR system may access image data showing a real-world location, and then add AR features to these images. The AR features may include objects such as home improvement finishes that may be modified. The AR features may additionally include windowed or tiled areas showing interfaces with any additional information as detailed throughout the above specification. The AR augmented images may then be output to a display for viewing and user interface interactions.

In various implementations, the operating system 2104 manages hardware resources and provides common services. The operating system 2104 includes, for example, a kernel 2120, services 2122, and drivers 2124. The kernel 2120 acts as an abstraction layer between the hardware and the other software layers, consistent with some embodiments. For example, the kernel 2120 provides memory management, processor management (e.g., scheduling), component management, networking, and security settings, among other functionality. The services 2122 can provide other common services for the other software layers. The drivers 2124 are responsible for controlling or interfacing with the underlying hardware, according to some embodiments. For instance, the drivers 2124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2106 provide a low-level common infrastructure utilized by the applications 2110. The libraries 2106 can include system libraries 2130 (e.g., C standard library) that can provide functions such as memory allocation functions, string manipulation functions, mathematic functions, and the like. In addition, the libraries 2106 can include API libraries 2132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 2106 can also include a wide variety of other libraries 2134 to provide many other APIs to the applications 2110.

The frameworks 2108 provide a high-level common infrastructure that can be utilized by the applications 2110, according to some embodiments. For example, the frameworks 2108 provide various graphic user interface (GUI) functions, high-level resource management, high-level location services, and so forth. The frameworks 2108 can provide a broad spectrum of other APIs that can be utilized by the applications 2110, some of which may be specific to a particular operating system or platform.

In an example embodiment, the applications 2110 include a home application 2150, a contacts application 2152, a browser application 2154, a book reader application 2156, a location application 2158, a media application 2160, a phone application 2167, a game application 2164, and a broad assortment of other applications such as a third-party application 2166. In some embodiments, a home improvement application 2162 is configured for operation on a client device 130 used to communicate with a remote server 120 as part of operation of a home improvement platform in accordance with embodiments described herein.

According to some embodiments, the applications 2110 are programs that execute functions defined in the programs. Various programming languages can be employed to create one or more of the applications 2110, structured in a variety of manners, such as object-oriented programming languages (e.g., Objective-C, Java, or C++) or procedural programming languages (e.g., C or assembly language). In a specific example, the third-party application 2166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2166 can invoke the API calls 2112 provided by the operating system 2104 to facilitate functionality described herein.

FIG. 22 is a block diagram illustrating components of a machine 2200, according to some embodiments, able to read instructions from a machine-readable medium (e.g., a machine-readable storage medium) and perform any one or more of the methodologies discussed herein. Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein can be executed. In alternative embodiments, the machine 2200 operates as a standalone device or can be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

In various embodiments, the machine 2200 comprises processors 2210, memory 2230, and I/O components 2250, which can be configured to communicate with each other via a bus 2202. In an example embodiment, the processors 2210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) include, for example, a processor 2212 and a processor 2214 that may execute the instructions 2216. The term "processor" is intended to include multi-core processors that may comprise two or more independent processors (also referred to as "cores") that can execute instructions contemporaneously. Although FIG. 22 shows multiple processors 2210, the machine 2200 may include a single processor with a single core, a single processor with multiple cores (e.g., a multi-core processor), multiple processors with a single core, multiple processors with multiple cores, or any combination thereof.

The memory 2230 comprises a main memory 2232, a static memory 2234, and a storage unit 2236 accessible to the processors 2210 via the bus 2202, according to some embodiments. The storage unit 2236 can include a machine-readable medium 2238 on which are stored the instructions 2216 embodying any one or more of the methodologies or functions described herein. The instructions 2216 can also reside, completely or at least partially, within the main memory 2232, within the static memory 2234, within at least one of the processors 2210 (e.g., within the processor's cache memory), or any suitable combination thereof, during execution thereof by the machine 2200. Accordingly, in various embodiments, the main memory 2232, the static memory 2234, and the processors 2210 are considered machine-readable media 2238.

As used herein, the term "memory" refers to a machine-readable medium 2238 able to store data temporarily or permanently and may be taken to include, but not be limited to, random-access memory (RAM), read-only memory (ROM), buffer memory, flash memory, and cache memory.

While the machine-readable medium 2238 is shown in an example embodiment to be a single medium, the term "machine-readable medium" should be taken to include a single medium or multiple media (e.g., a centralized or distributed database, or associated caches and servers) able to store the instructions 2216. The term "machine-readable medium" shall also be taken to include any medium, or combination of multiple media, that is capable of storing instructions (e.g., the instructions 2216) for execution by a machine (e.g., the machine 2200), such that the instructions, when executed by one or more processors of the machine (e.g., the processors 2210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 2250 include a wide variety of components to receive input, provide output, produce output, transmit information, exchange information, capture measurements, and so on. In general, it will be appreciated that the I/O components 2250 can include many other components that are not shown in FIG. 22. The I/O components 2250 are grouped according to functionality merely for simplifying the following discussion, and the grouping is in no way limiting. In various example embodiments, the I/O components 2250 include output components 2252 and input components 2254. The output components 2252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2250 include cameras 2256, motion components 2258, environmental components 2260, or position components 2262, among a wide array of other components. For example, the camera(s) 2256 include components to capture images and videos. This may also include components to capture depth or distance information that may be integrated with the images and videos. The camera(s) 2256 may additionally include hardware, software, and firmware modules for processing image data received at one or more sensors of the camera(s) 2256 in order to adjust focus, color, brightness, or other aspects of images captured by the camera(s) 2256. The motion components 2258 include acceleration sensor components (e.g., accelerometer), gravitation sensor components, rotation sensor components (e.g., gyroscope), and so forth. The environmental components 2260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 include a network interface component or another suitable device to interface with the network 2280. In further examples, the communication components 2264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2270 may be another machine or any of a wide variety of peripheral devices (e.g., a peripheral device coupled via a Universal Serial Bus (USB)).

Moreover, in some embodiments, the communication components 2264 detect identifiers or include components operable to detect identifiers. For example, the communication components 2264 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2264, such as location via Internet Protocol (IP) geolocation, location via WI-FI® signal triangulation, location via detecting a BLUETOOTH® or NFC beacon signal that may indicate a particular location, and so forth.

Figure 23:
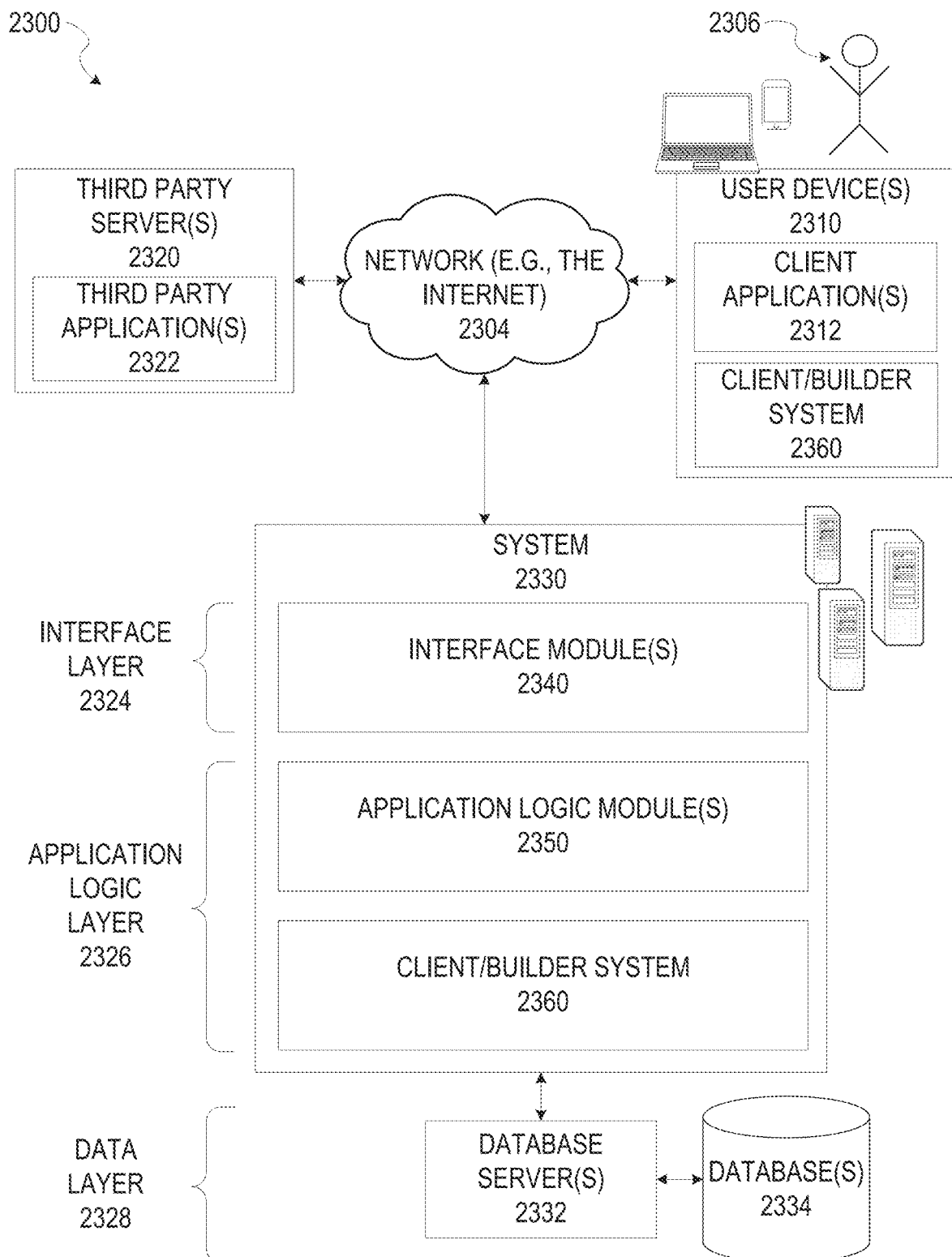
FIG. 23 is a diagram of a network that may be used for a client/contractor communication system in accordance with some embodiments.

FIG. 23 is a network diagram depicting a network system 2300 having a client-server architecture configured for exchanging data over a network, according to one embodiment. For example, the network system 2300 may be a messaging system where clients communicate and exchange data within the network system 2300. The data may pertain to various functions (e.g., sending and receiving video content as well as text and other media communication, etc.) and aspects associated with the network system 2300 and its users. Although the network system 2300 is illustrated herein as having a client-server architecture, other embodiments may include other network architectures, such as peer-to-peer or distributed network environments.

As shown in FIG. 23, the network system 2300 includes a system 2330. The system 2330 is generally based on a three-tiered architecture, consisting of an interface layer 2324, an application logic layer 2326, and a data layer 2328. As is understood by skilled artisans in the relevant computer and Internet-related arts, each module or engine shown in FIG. 23 represents a set of executable software instructions and the corresponding hardware (e.g., memory and processor) for executing the instructions. In various embodiments, additional functional modules and engines may be used with a messaging system, such as that illustrated in FIG. 23, to facilitate additional functionality that is not specifically described herein. Furthermore, the various functional modules and engines depicted in FIG. 23 may reside on a single server computer, or may be distributed across several server computers in various arrangements. Moreover, although the system 2330 is depicted in FIG. 23 as having a three-tiered architecture, the inventive subject matter is by no means limited to such an architecture.

As shown in FIG. 23, the interface layer 2324 consists of interface modules (e.g., a web server) 2340, which receive requests from various client-computing devices and servers, such as user devices 2310 executing client applications 2312, and third-party servers 2320 executing third-party applications 2322. In various embodiments, a user device 2310 may be associated with a client (e.g., property owner) user, or a professional or builder (e.g., a contractor or subcontractor) user, with various user interface and communication options available on a client/builder system 2360 depending on the particular role that the user of the user device 2310 has in a particular project (e.g., client, contractor, or subcontractor). In response to received requests, the interface modules 2340 communicate appropriate responses to requesting devices via a network 2304. For example, the interface modules 2340 can receive requests such as Hypertext Transfer Protocol (HTTP) requests, or other web-based application programming interface (API) requests.

The user devices 2310 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the user devices 2310 are executing the client applications 2312. The client applications 2312 can provide functionality to present information to a user 2306 and communicate via the network 2304 to exchange information with the system 2330. Each of the user devices 2310 can comprise a computing device that includes at least a display and communication capabilities with the network 2304 to access the system 2330. The user devices 2310 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Users 2306 can include a person, a machine, or other means of interacting with the user devices 2310. In some embodiments, the users 2306 interact with the system 2330 via the user devices 2310.

As shown in FIG. 23, the data layer 2328 has one or more database servers 2332 that facilitate access to information storage repositories or databases 2334. The databases 2334 are storage devices that store data such as member profile data, social graph data (e.g., relationships between members of the system 2330), inspiration page and finish pin data, project history data for any number of projects, and other user data.

An individual can register with the system 2330 to become a member of the system 2330. Once registered, a member can form social network relationships (e.g., friends, followers, or contacts) on the system 2330 and interact with a broad range of applications provided by the system 2330, as well as information on a user, whether the user is a professional, a property owner/client user, or both.

The application logic layer 2326 includes various application logic modules 2350, which, in conjunction with the interface modules 2340, generate various user interfaces with data retrieved from various data sources or data services in the data layer 2328. Individual application logic modules 2350 may be used to implement the functionality associated with various applications, services, and features of the system 2330. For instance, a social messaging application can be implemented with one or more of the application logic modules 2350. The social messaging application provides a messaging mechanism for users of the user devices 2310 to send and receive messages that include text and media content such as pictures and video. The user devices 2310 may access and view the messages from the social messaging application for a specified period of time (e.g., limited or unlimited). Of course, other applications and services may be separately embodied in their own application logic modules 2350.

As illustrated in FIG. 23, the system 2330 and/or user devices 2310 include a client/builder system 2360 that provides functionality to enable a client/contractor communication system. In other various embodiments, the client/builder system 2360 can be implemented as a standalone system and is not necessarily included in the system 2330. In some embodiments, the user devices 2310 include a portion of the client/builder system 2360 (e.g., a portion of the client/builder system 2360 may be included independently or in the client applications 2312). In embodiments where the user devices 2310 include a portion of the client/builder system 2360, the user devices 2310 can work alone or in conjunction with the portion of the client/builder system 2360 included in a particular application server or included in the system 2330.

In various example embodiments, one or more portions of the network 2280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2280 or a portion of the network 2280 may include a wireless or cellular network, and the coupling 2282 may be a Code Division Multiple Access (CDMA) connection, a Global System for Mobile communications (GSM) connection, or another type of cellular or wireless coupling. In this example, the coupling 2282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2216 are transmitted or received over the network 2280 using a transmission medium via a network interface device (e.g., a network interface component included in the communication components 2264) and utilizing any one of a number of well-known transfer protocols (e.g., Hypertext Transfer Protocol (HTTP)). Similarly, in other example embodiments, the instructions 2216 are transmitted or received using a transmission medium via the coupling 2272 (e.g., a peer-to-peer coupling) to the devices 2270. The term "transmission medium" shall be taken to include any intangible medium that is capable of storing, encoding, or carrying the instructions 2216 for execution by the machine 2200, and includes digital or analog communications signals or other intangible media to facilitate communication of such software.

Furthermore, the machine-readable medium 2238 is non-transitory (in other words, not having any transitory signals) in that it does not embody a propagating signal. However, labeling the machine-readable medium 2238 "non-transitory" should not be construed to mean that the medium is incapable of movement; the machine-readable medium 2238 should be considered as being transportable from one physical location to another. Additionally, since the machine-readable medium 2238 is tangible, the machine-readable medium 2238 may be considered to be a machine-readable device.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A device comprising:
a display;
a memory coupled to the display; and
one or more processors coupled to the memory and the display, the one or more processors configured to:
receive a plurality of finish pin data sets, each finish pin data set associated with a corresponding finish element of a construction project, wherein each finish pin data set comprises three-dimensional (3D) modeling data for the corresponding finish element;
analyze each finish pin data set to identify associated project context information;
based on the project context information, generate task elements of a task list and associated subproject indicators for a project chart of the construction project;
automatically generate the project chart with the subproject indicators for at least a first finish element based on the task elements and the project context information and one or more associated relationships with related subproject indicators within the project chart, the project chart including a plurality of project positions corresponding to different stages of completion of the construction project;
automatically generate a plurality of 3D models for the construction project, each 3D model of the plurality of 3D models associated with a corresponding project position in the project chart; and
output one or more images for a first 3D model of the plurality of 3D models on the display using an augmented reality/virtual reality (AR/VR) interface, wherein the first 3D model is selected using the AR/VR interface from the plurality of 3D models by selection of a corresponding first intermediate project position in the project chart, and wherein the images of the first 3D model include finish elements that are modifications of and are displayed on top of what is actually present at the location of the construction project.

2. The device of claim 1, wherein the one or more processors are further configured to:
receive an input selecting a corresponding second project position in the project chart associated with a second 3D model of the plurality of 3D models; and
outputting one or more images of the second 3D model.

3. The device of claim 2, wherein the second 3D model comprises a final 3D model of the construction project; and
wherein the first 3D model comprises an intermediate 3D model of the construction project with one or more missing finishes.

4. The device of claim 1, wherein the one or more processors are further configured to:
receive a change to a first finish pin data set of the plurality of finish pin data sets; and
automatically update one or more models of the plurality of 3D models in response to the change to the first finish pin data set.

5. The device of claim 1, wherein one or more finish pin data sets of the plurality of finish pin data sets comprise data for a pre-designed building.

6. The device of claim 5, wherein the one or more finish pin data sets comprise a first pre-designed building module data set, a second pre-designed building module data set, and interface data for connecting the first and second pre-designed building module data sets within the plurality of 3D models.

7. The device of claim 1, wherein the plurality of finish pin data sets comprise one or more placeholder data sets associated with missing information and a prompt to select a finish.

8. The device of claim 1 wherein the one or more processors are further configured to generate one or more automated messages associated with timing elements of the related subproject indicators of the project chart matching a current clock time of the device.

9. The device of claim 1 wherein the one or more processors are further configured to:
process a user input associated with a change in one or more finish elements associated with the construction project;
in response to the user input, automatically generate a change request, the change request comprising an updated project chart based on the change in the one or more finish elements, and automatically update the one or more 3D models.

10. The device of claim 1 wherein the one or more processors are further configured to:
process a completion message associated with a first subproject indicator of the project chart;
in response to the completion message, automatically generate one or more communications for at least a second subproject associated with a second subproject indicator dependent on completion of a first subproject associated with the first subproject indicator; and
update a corresponding 3D model associated with the first subproject indicator to indicate that work associated with the corresponding 3D model is fixed and completed.

11. The device of claim 1 wherein a first finish pin data set associated with the first finish element comprises first associated project context information comprising modeling data associated with placement of the first finish element within a project model.

12. The device of claim 11 wherein the one or more processors are further configured to:
receive a confirmed update to the placement of the first finish element within the project model; and automatically generate a change request communication in response to the confirmed update to the placement, the change request communication comprising a request for a change request quote associated with a cost and at least one timing change to the project chart; and automatically update the plurality of 3D models based on the confirmed update to the placement of the first finish element.

13. The device of claim 12 wherein the one or more processors are further configured to:
store data for each iteration of the project chart along with each associated bid response, bid acceptance confirmation, change request, change request quote, and change request approval, an associated set of 3D models; and
automatically generate a final project report comprising the data for each iteration of the project chart in response to a completion notification for a final completion indicator of the project chart.

14. A non-transitory computer readable medium comprising instructions that, when executed by one or more processors of a computing device, cause the computing device to perform operations comprising:
receiving a plurality of finish pin data sets, each finish pin data set associated with a corresponding finish element of a construction project, wherein each finish pin data set comprises three-dimensional (3D) modeling data for the corresponding finish element;
analyzing each finish pin data set to identify associated project context information;
based on the project context information, generating task elements of a task list and associated subproject indicators for a project chart of the construction project;
automatically generating the project chart with the subproject indicator for at least a first finish element based on the task elements and the project context information and one or more associated relationships with related subproject indicators within the project chart, the project chart including a plurality of project positions corresponding to different stages of corresponding to different stages of completion of the construction project;
automatically generating a plurality of 3D models for the construction project, each 3D model of the plurality of 3D models associated with a corresponding project position in the project chart; and
outputting one or more images for a first 3D model of the plurality of 3D models on a display using an augmented reality/virtual reality (AR/VR) interface, wherein the first 3D model is selected using the AR/VR interface from the plurality of 3D models by selection of a corresponding intermediate project position in the project chart, and wherein the images of the first 3D model include finish elements that are modifications of and are displayed on top of what is actually present at the location of the construction project.

15. The non-transitory computer readable medium of claim 14, wherein the one or more processors are further configured to:
receive an input selecting a corresponding second project position in the project chart associated with a second 3D model of the plurality of 3D models; and
outputting one or more images of the second 3D model.

16. The non-transitory computer readable medium of claim 15, wherein the one or more processors are further configured to:
receive a change to a first finish pin data set of the plurality of finish pin data sets; and
automatically update one or more models of the plurality of 3D models in response to the change to the first finish pin data set.

17. A computing device comprising a display screen interface of an augmented reality (AR) display or a virtual reality (VR) display displaying a three-dimensional (3D) model of a first construction project, the computing device being further configured to display within the display screen a project chart interface associated with a plurality of subproject indicators for the first construction project, the project chart interface including a plurality of project positions corresponding to different stages of completion of the construction project, wherein the display screen interface is further configured to display the 3D model based on a selected project position with the project chart interface, and to allow access to a plurality of 3D models each associated with different project positions, corresponding to different stages of completion of the construction project, within the project chart interface and corresponding subproject indicators for the first construction project that can be reached directly from the project chart interface to display a corresponding 3D model of the first construction project associated with the different positions within the project chart interface and the corresponding subproject indicators, and wherein, in use, images of the first 3D model include finish elements that are modifications of and are displayed on top of what is actually present at the location of the construction project.

18. The computing device of claim 17 further comprising a camera device configured to capture an image of an environment associated with the construction project, and to output one or more images comprising the image of the environment with the corresponding 3D model placed in the image of the environment a part of the AR display.

19. The computing device of claim 17 further comprising an interface for receiving changes to one or more finish pins associated with the plurality of 3D models, wherein the device is configured to automatically update the plurality of 3D models in response to changes to the one or more finish pins, and wherein the device is further configured to update display of the corresponding 3D model in response to the update to the plurality of 3D models in response to changes to the one or more finish pins.

20. The computing device of claim 17 wherein a first 3D model comprises a final 3D model of the construction project; and
wherein a second 3D model comprises an intermediate 3D model of the construction project with one or more missing finishes.

* * * * *